US012711478B2

(12) United States Patent
Rai et al.

(10) Patent No.: US 12,711,478 B2
(45) Date of Patent: Aug. 18, 2026

(54) CONTROL USE AND OWNERSHIP OF DIGITAL ASSETS IN META VERSE

(71) Applicant: Cisco Technology, Inc., San Jose, CA (US)

(72) Inventors: Pete Rai, Egham (GB); Joel Abraham Obstfeld, Bushey (GB); Simon Peter James Dyke, Lyndhurst (GB); James Geoffrey Walker, Rogate (GB); Oliver James Bull, Bristol (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 584 days.

(21) Appl. No.: 18/161,999

(22) Filed: Jan. 31, 2023

(65) Prior Publication Data

US 2024/0257101 A1 Aug. 1, 2024

(51) Int. Cl.
*G06Q 20/12* (2012.01)
*G06Q 20/36* (2012.01)
(Continued)

(52) U.S. Cl.
CPC ......... *G06Q 20/1235* (2013.01); *G06Q 20/36* (2013.01); *G06Q 30/0643* (2013.01); *G06T 13/40* (2013.01); *G06Q 2220/00* (2013.01)

(58) Field of Classification Search
None
See application file for complete search history.

(56) References Cited

U.S. PATENT DOCUMENTS

2003/0014423 A1 1/2003 Chuah et al.
2009/0313556 A1 * 12/2009 Hamilton ............. G06F 21/105 715/757

(Continued)

FOREIGN PATENT DOCUMENTS

TW M626295 U 5/2022
WO WO-2023122182 A1 * 6/2023 ........... H04L 9/3297

OTHER PUBLICATIONS

Lloyd, A., et al, “An unreal issue: managing IP in the metaverse,” Technology’s Legal Edge, A Global Technology Sector Blog, https://www.technologyslegaledge.com/2021/11/an-unreal-issue-managing-ip-in-the-metaverse/, Nov. 4, 2021, 5 pages.

(Continued)

*Primary Examiner* — Patrick McAtee
*Assistant Examiner* — Jason B Fenstermacher
(74) *Attorney, Agent, or Firm* — Edell, Shapiro & Finnan, LLC

(57) ABSTRACT

Methods that control use, trace ownership and authenticity of digital assets and/or brandmarks in a metaverse environment. The methods involve obtaining a first set of control properties associated with a digital asset and a second set of control properties associated with a brandmark. The first set of control properties define first usage rules for rendering the digital asset in the metaverse environment in which a user is immersed into a virtual environment and the second set of control properties define second usage rules for rendering the brandmark in the metaverse environment. The methods further involve determining whether the digital asset is compatible with the brandmark based on the first set of control properties and the second set of control properties and rendering the digital asset with the brandmark in the metaverse environment based on determining that the digital asset is compatible with the brandmark.

21 Claims, 12 Drawing Sheets

(51) Int. Cl.
*G06Q 30/0601* (2023.01)
*G06T 13/40* (2011.01)

(56) References Cited

U.S. PATENT DOCUMENTS

| | | | | |
|---|---|---|---|---|
| 2017/0048199 | A1* | 2/2017 | Hutton | H04L 63/0263 |
| 2019/0073606 | A1* | 3/2019 | Columbia-Walsh | G06N 20/00 |
| 2020/0119925 | A1* | 4/2020 | Wang | G06Q 20/3829 |
| 2021/0201336 | A1* | 7/2021 | Mallett | G06F 3/011 |
| 2021/0383115 | A1* | 12/2021 | Alon | A63F 13/77 |
| 2021/0398095 | A1 | 12/2021 | Mallett et al. | |
| 2022/0043557 | A1 | 2/2022 | Pulier et al. | |
| 2022/0122050 | A1 | 4/2022 | Pacella et al. | |
| 2022/0150071 | A1* | 5/2022 | Schwarz | H04L 9/3268 |
| 2022/0292588 | A1 | 9/2022 | Collen | |
| 2023/0115709 | A1* | 4/2023 | Collart | G06T 15/005 726/1 |
| 2023/0325896 | A1* | 10/2023 | Luker | G06Q 30/0643 705/26.1 |
| 2024/0171393 | A1* | 5/2024 | Bathen | H04L 9/3236 |

OTHER PUBLICATIONS

Accesswire, "The Falcon Project Introduces Proof of Ownership using NFT Certificates," Falcon Project, https://www.accesswire.com/625621/The-Falcon-Project-Introduces-Proof-of-Ownership-using-NFT-Certificates, Jan. 24, 2021, 4 pages.

Opensea, "What is a verified account or badged collection?," OpenSea Help Center, Policies, https://support.opensea.io/hc/en-us/articles/360063519133-What-is-a-verified-account-or-badged-collection-, retrieved Oct. 19, 2022, 8 pages.

* cited by examiner

900
REQUEST DIGITAL ASSET
910
902
901
804
RETRIEVE AND PROVIDE EXPERIENCE TOKENS
912
602
0XFEBEEFDEADEF
603
604
TRANSFER OWNERSHIP OF DIGITAL ASSET
914
1001 EXP 0110
1011 EXP 0101
1111 EXP 0110
908a-j
STORE
916
904
906

CONTROL USE AND OWNERSHIP OF DIGITAL ASSETS IN META VERSE

TECHNICAL FIELD

The present disclosure generally relates to virtual environments.

BACKGROUND

A metaverse is an evolution of the Internet. In metaverse, humans interact "within" or are immersed into a virtual environment. Virtual environments enable immersive experiences for their users utilizing techniques such as augmented, mixed, and virtual reality, through a range of human-to-machine interface methods including headsets, microphones and headphones, haptic feedback solutions, etc. Some virtual environments are intended to mimic interactions that would take place in the physical world and provide assets of the physical world. Other virtual environments may create interactions within a fantasy world where different laws of physics may apply and fictional assets may be used. By using these technologies, users interact with each other and use a range of services and various digital assets, regardless of geographical location or physical capability. In these virtual environments, it may be desirable to control the use of digital assets. A digital asset may be a valuable commodity provided its authenticity and/or ownership can be verified.

DETAILED DESCRIPTION

Overview

Figure 1:
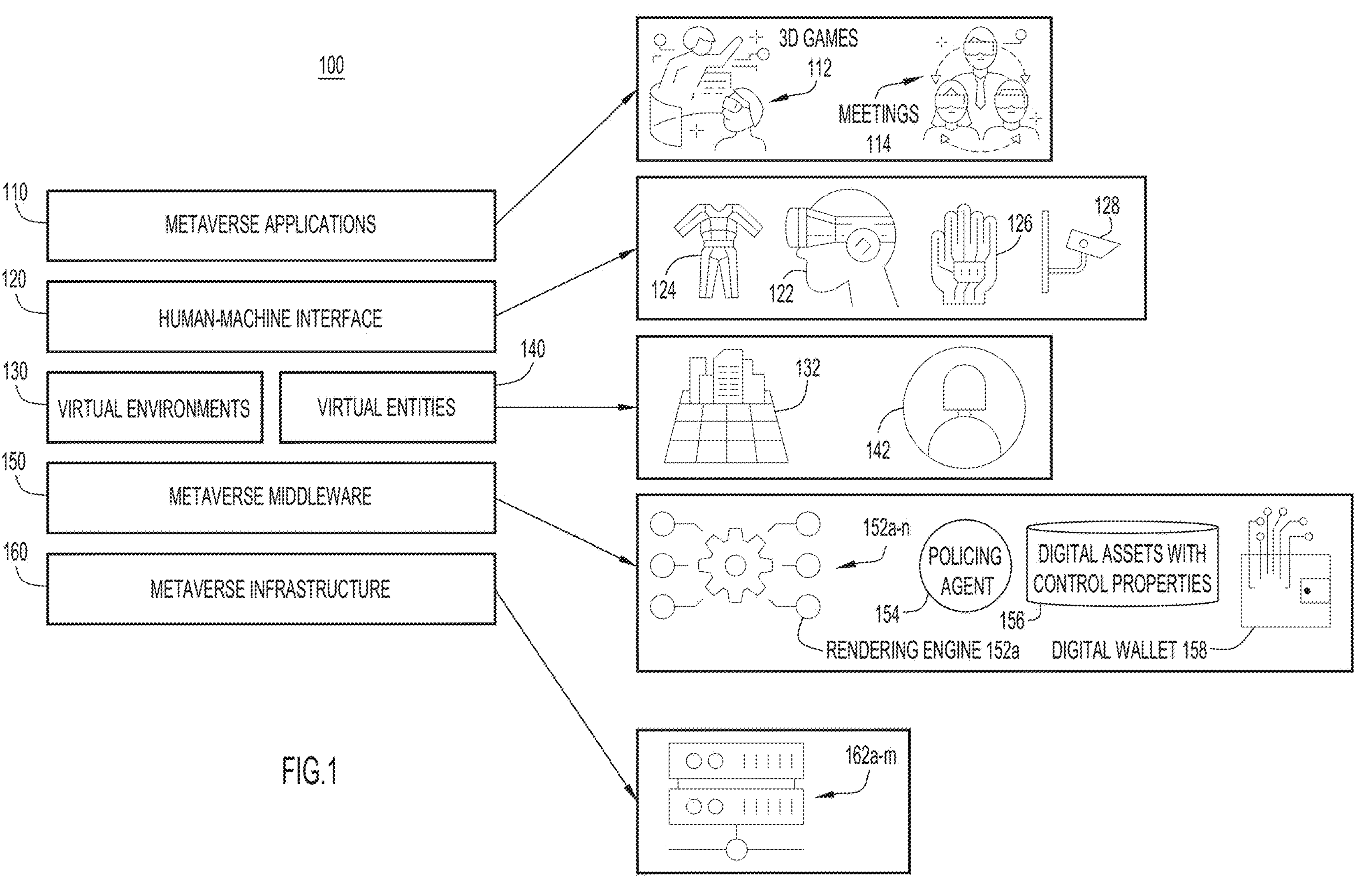
FIG. 1 is a block diagram illustrating a metaverse system which includes a policing agent that enforces control policies for rendering a digital asset, verifies ownership and/or authenticity of the digital asset, according to an example embodiment.

Techniques are presented herein to control use of digital assets and/or brandmarks. The techniques provide for verifying ownership and/or authenticity of digital assets and for tracing usage of digital assets in metaverse, i.e., virtualized environments.

In one form, the method involves obtaining a first set of control properties associated with a digital asset and a second set of control properties associated with a brandmark. The first set of control properties define first usage rules for rendering the digital asset in a metaverse environment in which a user is immersed into a virtual environment. The second set of control properties defines second usage rules for rendering the brandmark in the metaverse environment. The method further involves determining whether the digital asset is compatible with the brandmark based on the first set of control properties and the second set of control properties and rendering the digital asset with the brandmark in the metaverse environment based on determining that the digital asset is compatible with the brandmark.

In another form, the method involves detecting an occurrence of an event in a metaverse environment in which a user is immersed into a virtual environment. The event is associated with a digital asset. The method further involves generating an experience token for the digital asset. The experience token is indicative of the event. The method further involves storing the experience token in a digital wallet in association with the digital asset.

Example Embodiments

A metaverse environment is a computer-generated and visually rendered environment in which entities are represented with avatars. An avatar may be textual (e.g., username), a two-dimensional graphical representation, a three-dimensional graphical representation, or any other perceivable representation of an entity in the metaverse environment. In this computer-generated environment, entities may use various digital assets. A digital asset is a digital commodity such as a virtual item, an element in the metaverse, a virtual component associated with the avatar, or the avatar itself. For example, the digital asset may be a skin for the avatar, a piece of clothing worn by an avatar such as a jacket or shoes, an accessory item for the avatar such as jewelry, a shield, a sword, a special tool, etc., or some other element that is applied to or associated with the avatar e.g., a ball, a cup, etc. As another example, the digital asset may be a piece of virtual furniture in a virtual meeting room, a virtual tree, or even a virtual house.

Marketplaces have evolved for selling digital assets, for example, for use by the avatars. Enterprises with brandmarks are also establishing themselves in the metaverse by providing their brandmarks in virtualized environments. In the digital realm where digital assets are being "mashed up" or integrated with other assets, brandmark reputation and image are important aspects to protect. Brandmark owners desire to control and/or restrict the virtual environments or circumstances within the virtual environments in which their digital assets and/or their brandmark are observed and/or used.

Moreover, digital assets are valuable commodities that may be traded or sold. Similar to the physical world, verification of ownership of the digital assets is important for virtual transactions. Additionally, a digital asset may become a valuable commodity based on how it is used in the metaverse. For example, a ball used by an avatar to score a game winning goal may become a valuable digital asset based on this activity. This ball, however, would involve verification of ownership and authentication that it is, in fact, the ball that was used to score the game winning goal. Given the nature of the computer-generated environment, it is challenging to control use of digital assets and/or brandmarks, verify their ownership and authenticity, and trace usage in a metaverse.

Techniques presented herein control use and trace ownership and/or usage of digital assets and/or brandmarks in metaverse, i.e., virtualized environments, by generating control properties applied for rendering digital assets and by generating tokens that are recorded in a digital wallet of the user.

FIG. 1 is a block diagram illustrating a metaverse system 100 which includes a policing agent that enforces control policies for rendering a digital asset and a digital wallet used for verifying ownership and/or authenticity of the digital asset and tracing usage of the digital asset in a metaverse environment, according to one or more example embodiments. The metaverse system 100 includes metaverse applications 110, a human-machine interface 120, virtual environments 130, virtual entities 140, metaverse middleware 150, and a metaverse infrastructure 160.

In the metaverse system 100, the metaverse applications 110 are client applications that immerse one or more users into various digital or virtual spaces referred to as a "virtual environment". Virtual environments represent a physical world and/or fantasy worlds. Using the metaverse applications 110, users feel as if they are inside, i.e., immersed into, a virtual space or environment as opposed to the actual physical world. By way of an example and not by way of a limitation, the metaverse applications 110 may provide 3D games 112 (single or multi-player), online virtual meetings 114 (social or work collaboration spaces), sports, exercises, training, and/or shopping. Some metaverse applications may involve specialized equipment and/or tools e.g., performing a surgery, controlling a drone, flying an airplane, etc. There are many different types of metaverse applications 110. Further, metaverse applications 110 provide different user experiences and render different virtual environments within a metaverse environment or metaverse world.

For example, online virtual meetings 114 may immerse a user into a virtual bar space where the user's avatar performs human actions and interacts with other avatars in the virtual bar space. The avatar may use a variety of digital assets such as a virtual chair, a virtual table, a virtual wine glass, a virtual bottle, etc. The online virtual meetings 114 may immerse a user into an office building where a user (using an avatar) enters a conference room space and initiates an online collaboration session with other coworkers (represented by avatars). The avatar may use a different type of digital assets such as a virtual whiteboard, a virtual desk, a virtual telephone, open a virtual door, etc. The 3D games 112 may immerse a user into a fantasy world where the user's avatar may look like a unicorn, fly like a bird, swim like a fish, bark like a dog, etc. The avatar may use yet a different type of digital assets such as skins, wings to fly, a dog collar, a dog leash, a virtual shield and sword, etc. Some of the metaverse applications 110 may provide training environments such as a surgery room space where the user (using the avatar) performs a surgery on a patient represented by another avatar (e.g., a software-based entity). The avatar may use yet another type of digital assets such as virtual medical monitoring and detection equipment. Further, metaverse applications 110 may render a virtual environment in which a user controls specialized equipment e.g., a machine or a robot, to perform a specific task. While in this virtual environment, there may be no avatar to represent the user and instead the user is represented by a pair of arms, for example, extending towards a virtual machine i.e., another type of digital asset.

The users interact in virtual environments provided by the metaverse applications 110 using the human-machine interface 120. The human-machine interface 120 may also vary widely depending on the use case scenarios. The human-machine interface 120 includes various user devices (endpoint devices) and/or external sensors 128. User devices allow users to interact with the virtual environments and render the virtual environments for the users as instructed by the metaverse applications 110 that define input/output for their respective virtual environment(s). The external sensors generate a plurality of data streams indicative of conditions of the physical space and/or the user's motion. The human-machine interface 120 is configured to monitor activity in a metaverse environment and may further include specialized user devices such as surgical instruments and/or training equipment with various built-in sensors to detect user interactions/motion.

Typically, however, the human-machine interface 120 includes user devices such as a sensory immersive headset 122, a haptic body suit 124, haptic gloves 126, directional motion simulations, handheld controllers, a keyboard, a touch screen, goggles, a personal computer, and/or etc. These user devices include sensors to detect the user's motion, interactions, attributes, and/or biometrics (e.g., pulse, heartrate, etc.). These sensors may further monitor the physical space around the user. These sensors generate data streams indicative of user motions. The user devices also include one or more visual displays to immerse the user into the metaverse environment. Additionally, the human-machine interface 120 may include user devices such as a microphone, speakers, haptic devices, olfactory devices, etc.

The external sensors 128, such as a camera, may also monitor the user and/or the physical space around the user. The external sensors 128 may also generate data streams indicative of the user motions and environment. The external sensors 128 may monitor actions in the real-world environment and translate these actions into one of the virtual environments 130 by applying them to the user's avatar.

In various example embodiments, user devices and external sensors 128 may each include a network interface, at least one processor, and a memory. Each user device or each external sensor may be an apparatus or any programmable electronic or computing device capable of executing computer readable program instructions. The network interface may include one or more network interface cards (having one or more ports) that enable components of the entity to send and receive packets or data over network(s) such as a local area network (LAN) or a wide area network (WAN), and/or wireless access networks. Each user device or each external sensor may include internal and external hardware components such as those depicted and described in further detail in FIG. 12. In one example, at least some of these user devices and external sensors 128 may be embodied as virtual devices with functionality distributed over a number of hardware devices, such as servers, etc. For example, some of the computational workload may be performed in a cloud.

As noted above, metaverse applications 110 immerse users into virtual environments 130 that vary widely. For example, a virtual environment may be a virtual city space 132 that mimics a real-world city with buildings, streets, shops, etc. As another example, a virtual environment may be an office with conference or meeting rooms in which a table, chairs, a phone, a whiteboard, etc. are provided for the users to interact with using their avatars. In yet another example, a virtual environment may be an attorney's office, a bank branch, a surgery room, an exercise gym, a swimming pool, etc. Virtual environments 130 are visually rendered environments that have various characteristics or attributes. Attributes of the virtual environments 130 may be defined based on a physics engine, geospatial positions and interaction, art direction, audio design, haptic design, textures, etc. The virtual environments 130 may depict therein virtual entities 140 (a digital representation) such as the avatar 142. The avatar 142 represents a human user or a software-based entity (e.g., a patient simulator) and is an example of a digital representation of an entity in a metaverse environment.

The avatar 142 may be associated with various digital assets that include but are not limited to skins, clothes, tools, equipment, etc. These digital assets may be associated with one or more brandmarks. For example, the avatar 142 may be wearing a virtual hat (a first digital asset) with a first logo A that belongs to a brandmark owner A and a sweater (a second digital asset) with a second logo B of a brandmark owner B. The avatar 142 may also be carrying a sword (a third digital asset). The avatar 142 may also have various capabilities (fly, run, etc.).

While only the avatar 142 is shown, it is understood that users may have a plurality of avatars. Further, while non-limiting examples of the digital assets described above define the digital asset as an item or an element associated with an avatar, the avatar itself may be a digital asset that is controlled by the owner and/or that may be transferred to another user. The virtual environments 130 are specified in the metaverse applications 110 and virtual entities 140 may be rendered using the metaverse middleware 150.

The metaverse middleware 150 provides basic functions 152*a-n* such as a rendering engine 152*a* that renders the virtual environments 130 with virtual entities 140 and/or respective digital assets, a policing agent 154, one or more data stores including a database that stores digital assets with control properties 156 and a digital wallet 158 that stores entity and experience tokens.

The notations 1, 2, 3, . . . n; a, b, c, . . . n; "a-n", and the like illustrate that the number of elements can vary depending on a particular implementation and is not limited to the number of elements being depicted or described.

The basic functions 152*a-n* may further include processing engines, analytics, trackers, and/or detectors, for rendering and interacting in the virtual environments 130. The processing engines include a three-dimensional (3D) engine for rendering virtual environments 130 in 3D (360 degrees view), physics engines that define interactions in the virtual environments 130, and audio engines that process detected audio streams and/or render sounds and/or utterances in the virtual environments 130. Trackers track the state of a virtual environment (running, loaded, etc.), state and location of avatars and other digital assets (e.g., at a particular location within the virtual environments 130), etc. The tracking information may be shared in the metaverse environment. Detectors detect collisions among avatars or objects, conflicts in rendering various objects, etc.

The metaverse middleware 150 may further include financial services, advertising services, e-stores (for avatars, skins, accessories, other digital assets, etc.), design tools, and frameworks. In one example embodiment, the metaverse middleware 150 includes a standard library of basic functions (not specific to metaverse) and the metaverse-related functions are defined by the metaverse applications 110. The basic functions 152*a-n* may vary in number and types based on a particular deployment and use case scenario.

The policing agent 154 is configured to control use of digital assets and/or brandmarks. The policing agent 154 is further configured to verify ownership and/or authenticity of digital assets and to trace usage of digital assets in the metaverse.

The database that stores digital assets with control properties 156 includes usage rules for the rendering engine 152*a* to render the respective brandmark and/or the digital asset in the virtual environments 130. That is, a set of control properties defines usage rules for a digital asset. For example, the set of control properties may define one or more attributes of the digital asset (size, color, location, etc.), behavior of the digital asset, one or more characteristics of the metaverse environment in which the digital asset is to be rendered (any virtual environment that is not 18+ such as a virtual bar), and/or at least one fallback position with remedial actions if the digital asset cannot be rendered because of a conflict (e.g., display a white box instead of a digital asset). When a digital asset, such as a skin or a digital clothing item is generated, a set of control properties or attributes are defined by the asset's creator that become "locked" with the digital asset. That is, these control properties are generated in a manner such that they cannot be modified after the point of creation. For example, the asset creator may modify the control properties after its creation but the asset owner cannot modify any of the control properties. The control properties are locked after creation for the asset owner.

The digital wallet 158 is associated with a user immersed into the metaverse environment. Specifically, the digital wallet 158 may store entity tokens that define digital assets that belong to the user including the avatar 142 and other digital assets linked with the avatar 142. The entity tokens are signed using a private key of the user thereby binding the entity token to the digital wallet 158. The entity tokens include a unique address. The avatar 142 may be activated in the metaverse environment by opening the digital wallet 158 (using the owner's private key) and obtaining the entity token from the digital wallet 158. A transaction signed by the owner's private key confirms the authenticity of the binding. The digital wallet 158 provides for a verification of the owner's identity in a privacy-preserving manner, verifies the authenticity of the avatar 142 and associated entity tokens (by being bound to the digital wallet 158). The digital wallet 158 may further store experience tokens that indicate occurrences of life-cycle events in the metaverse environment related to the avatar 142 and/or its digital assets. The experience tokens provide a chain of metadata that is signed by the owner's private key and that is associated with activities of the avatar 142 and/or the digital asset such as lifecycle events including generation, transfer, use in an event in a metaverse environment, etc.

The basic functions 152*a-n* and the policing agent 154 may be loaded onto an operating system (OS) for execution.

In the metaverse system 100, the metaverse infrastructure 160 may include various hardware and software components 162*a-m*. Specifically, the metaverse infrastructure 160 includes appropriate hardware (e.g., processor(s), memory element(s), antennas and/or antenna arrays, baseband processors (modems), and/or the like such as those depicted and described in further detail in FIG. 12), software, logic, and/or the like to facilitate rendering of the metaverse environment and executing metaverse applications 110. For example, the metaverse infrastructure 160 includes compute resources (memories, CPUs, etc.), network and telecommunications (network interfaces, antennas, etc.), bandwidth, processing capacity, hosting, geolocation tracking/blocking (sensors), access and security related components (firewall, etc.), graphics processing units (GPUs), etc.

Figure 2B:
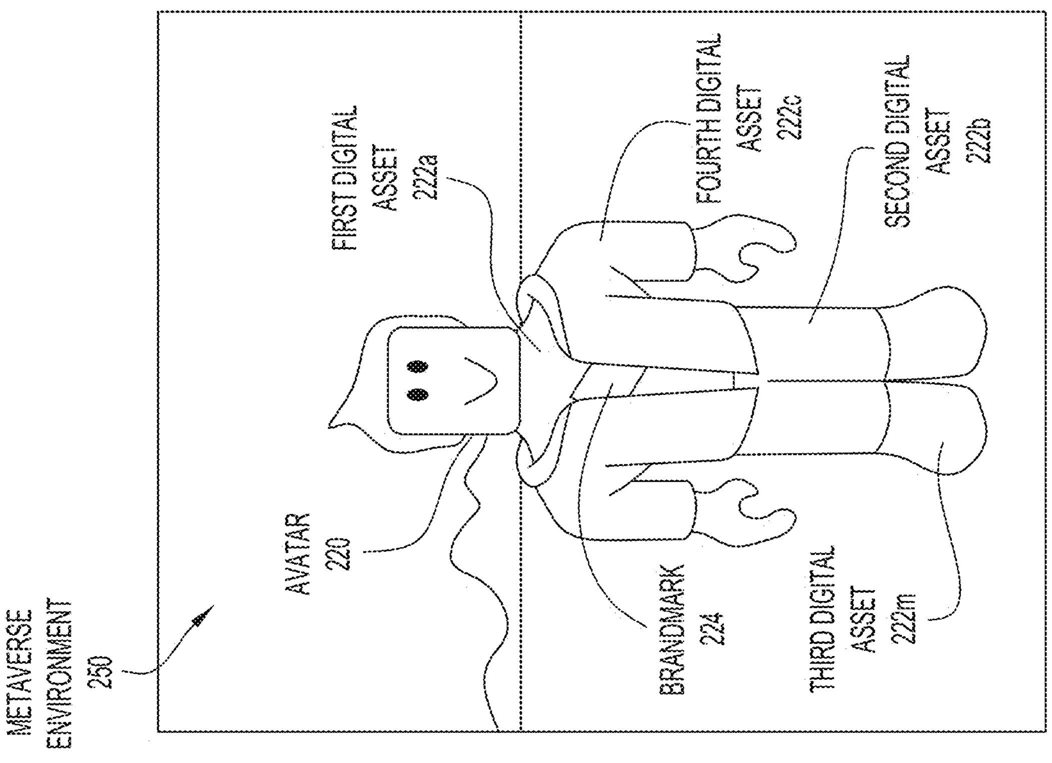
FIGS. 2A and 2B are views illustrating a first metaverse environment and a second metaverse environment, respectively, in which digital assets are rendered using the rendering, according to one or more example embodiments.
Figure 2A:
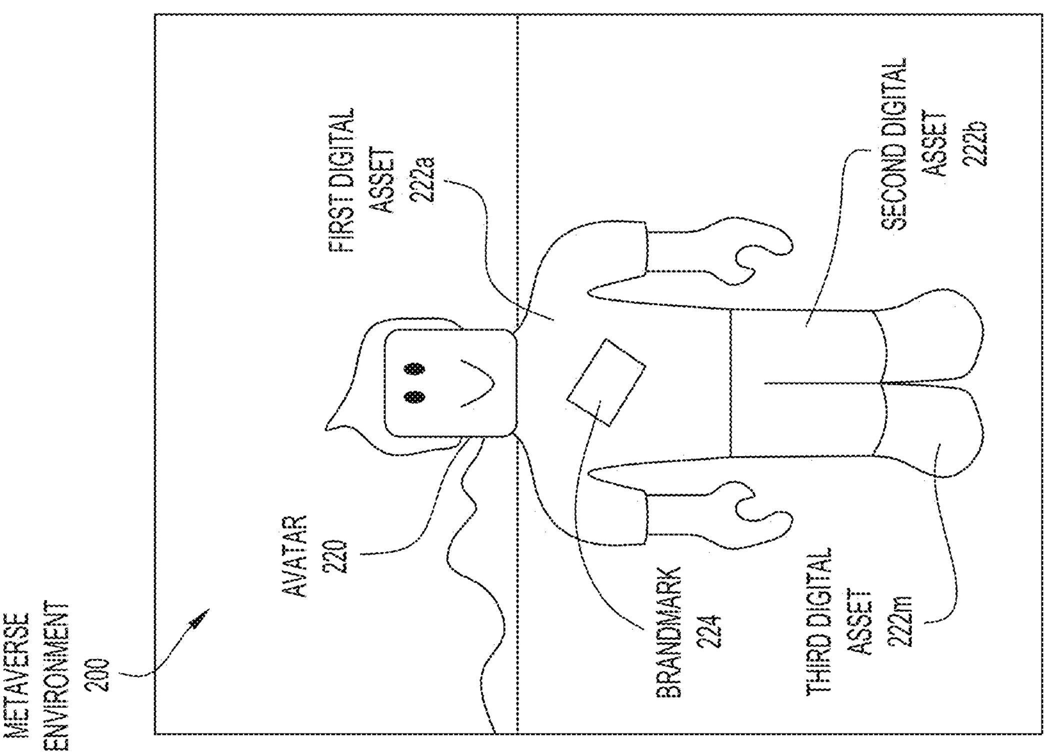

With continued reference to FIG. 1, FIGS. 2A and 2B are views illustrating a first metaverse environment 200 and a second metaverse environment 250, respectively, in which digital assets are rendered using the rendering engine 152*a*, according to one or more example embodiments. The first metaverse environment 200 and the second metaverse environment 250 each include a digital representation in a form of an avatar 220, a plurality of digital assets 222*a-m*, and a brandmark 224. While only one brandmark is depicted in the first metaverse environment 200 and the second metaverse environment 250, this is just an example, and multiple brandmarks may exist in a virtual environment.

By way of an example, the plurality of digital assets 222*a-m* include a first digital asset 222*a*, such as a t-shirt worn by the avatar 220, a second digital asset 222*b*, such as pants worn by the avatar 220, and a third digital asset 222*m*, such as shoes worn by the avatar 220. The first digital asset 222*a* includes the brandmark 224. In the second metaverse environment 250, the fourth digital asset 222*c* is included, such as a jacket worn by the avatar 220. The jacket at least partially covers the first digital asset 222*a* and the brandmark 224.

In one example embodiment, the inclusion of the brandmark 224 is a valuable element of the digital representation and/or the first digital asset 222*a*. A set of control properties is defined to protect the brandmark 224. The set of control properties determines elements of how the brandmark 224 is to appear in a metaverse environment. The set of control properties defines attributes of the brandmark 224 including color, size, and location for rendering the brandmark 224 with respect to the first digital asset 222*a*. The set of control properties may further define behavior, such as actions to perform in a metaverse environment based on the brandmark 224 being rendered, and/or one or more characteristics of the metaverse environment in which the brandmark 224 is not to be rendered. For example, if the metaverse environment is no longer child friendly, stop rendering the brandmark 224.

By way of an example, a set of control properties may lock the color, size, aspect ratio, and the position of the brandmark 224 being affixed to the first digital asset 222*a*. The set of control properties may further define behavioral characteristics such as playing a tune or jingle every time the brandmark 224 is revealed by the avatar 220 wearing the first digital asset 222*a*. These characteristics represent aspects that a brandmark owner may desire to control throughout the lifetime of the brandmark 224.

In one or more example embodiments, control properties are data elements or control property clauses that accompany the brandmark 224, a digital asset, and/or the avatar 220. That is, a set of control properties may be defined for the brandmark 224, for each of the plurality of digital assets 222*a-m*, and the avatar 220. These control properties are exposed in a manner such that when the avatar 220 is rendered in a particular virtualized environment, a first set of control properties associated with the brandmark 224 and a second set of control properties associated with the first digital asset 222*a* are obtained and analyzed by the rendering engine 152*a* of FIG. 1. The rendering engine 152*a* interprets attributes associated with the avatar 220 and the plurality of digital assets 222*a-m* including the brandmark 224 and generates a digital representation that complies with all of the control properties. The digital representation is compatible with different sets of control properties as determined by the rendering engine 152*a* and/or the policing agent 154 of FIG. 1. When conflicts between various control properties exist, a fallback position may be used.

The control properties may be defined in a machine-readable format and may be in a form of one or more schemas e.g., Extensible Markup Language (XML) schemas and/or JavaScript Object Notation (JSON) schemas. The schemas involve a definition of a respective digital asset, enumerations of its attributes, properties, characteristics, constraints, actions, fallback positions with remedial actions, one or more characteristics of the metaverse environment in which the respective digital asset is not to be rendered (prohibited virtual environments), etc. which are sufficient to express the control properties in a manner which can be read by and actioned by software agents such as the rendering engine 152*a* and/or the policing agent 154. The control properties are generated in a standardized descriptor format for expressions of defining features or control property clauses.

The above are just some examples of the control properties. The control properties may include many other characteristics and/or attributes (e.g., display brandmark 224 only in certain metaverse environments, e.g., peaceful metaverse environments-no guns, etc.), presence and co-location of other users in the virtual environment (e.g., avatars), etc. In other words, the number and type of control properties vary widely based on use case scenarios and digital assets involved.

In the first metaverse environment 200, the avatar 220 is rendered with the plurality of digital assets 222*a-m* including black shoes, blue trousers, and a white shirt with the brandmark 224 being visible, i.e., a black logo on the white shirt. The control properties associated with each digital asset define how the assets are to appear in the first metaverse environment 200. Namely, the shirt is to be displayed in white color only and the brandmark 224 is to appear in black and in the center of the shirt.

The policing agent 154 obtaining a first set of control properties associated with the first digital asset 222*a* and a second set of control properties associated with the brandmark 224, determines whether the first digital asset 222*a* is compatible with the brandmark 224 based on the first set of control properties and the second set of control properties and generates a digital representation that includes the first digital asset 222*a* with the brandmark 224 thereon based on control properties that define attributes for combining the two. Specifically, the policing agent 154 may transform, using a hash, the first set of control properties and the second set of control properties into a contract that represents a third set of combined control properties identifying the integration of the first digital asset 222*a* with the brandmark 224. The policing agent 154 further checks if conflicts exist with the first digital asset 222$a$ with the brandmark 224 and the second digital asset 222$b$, and with the third digital asset 222$m$. The policing agent 154 may generate a matching hash based on a set of combined control properties and control properties of the other assets to validate that the digital representation complies with all of the control properties of various digital assets being rendered. The rendering engine 152$a$ then renders the digital representation in the first metaverse environment 200.

In one or more example embodiments, some control properties such as attributes for combining or integrating the two digital assets and/or the brandmark 224 and a digital asset and/or the avatar 220 may not be controlled (undefined) meaning that aspects of the digital asset could be modified by the user, the rendering engine 152$a$, and/or the policing agent 154. For example, if the color control property is undefined or left blank, the owner, the user, or the rendering engine 152$a$ may then select the color for the first digital asset 222$a$, enabling the first digital asset 222$a$ to be rendered in green color on a first day, in blue color on a second day, and so on.

In the second metaverse environment 250, the avatar 220 includes an additional digital asset i.e., a fourth digital asset 222$c$ such as a jacket. The fourth digital asset 222$c$ obscures at least a portion of the brandmark 224 and the first digital asset 222$a$ in comparison to the first metaverse environment 200. This is just one non-limiting example of two digital assets intersecting and/or conflicting with each other, resulting in a loss of control for the brandmark owner. Brandmark owners may desire to protect their brandmarks and exert influence over how the brandmark 224 is rendered or displayed in the virtualized environments i.e., prevent another digital asset from covering the brandmark 224. Using the control properties, the brandmark owner enforces its usage rules for the brandmark 224 in virtualized environments. That is, the policing agent 154 determines that a conflict exists between the fourth digital asset 222$c$ and the brandmark 224 and may prevent the digital representation rendered in the second metaverse environment 250.

The techniques presented herein provide for defining control properties for a digital asset such as the avatar 220, the plurality of digital assets 222$a$-$m$, and/or the brandmark 224 such that a digital representation rendered in a metaverse environment is compatible with control properties set by owners. A user and/or an owner of a digital asset may use the basic functions 152$a$-$n$ of FIG. 1 to generate control properties and store them in the database of digital assets with control properties 156 such that the respective digital asset is locked with its control properties.

With continued reference to FIGS. 1, 2A, and 2B, FIG. 3 is a sequence diagram illustrating a method 300 of generating a new digital asset for a metaverse environment, according to an example embodiment. The method 300 involves a brandmark 302 such as the brandmark 224 of FIGS. 2A and 2B, a first set of control properties 304, a digital asset 322 such as one of the plurality of digital assets 222$a$-$m$ of FIGS. 2A and 2B, a second set of control properties 324, and a control properties database 330 such as the database of digital assets with control properties 156 of FIG. 1. The method 300 may be performed by a computing device and/or the metaverse system 100 of FIG. 1.

The method 300 involves at 350, a user generating a new asset (the digital asset 322). The user may use one or more user devices of the human-machine interface 120 to define rules for using and/or rendering the digital asset 322 in virtualized environments. The digital asset 322 may be an avatar and/or a digital asset associated with the avatar such as a shirt.

At 352, the user may request to add the brandmark 302 to the digital asset 322. The brandmark 302 may be a logo, a company name, a trademark, a symbol, an icon, etc. Since brandmark owners have defined control properties for their brandmarks, at 354, the method 300 involves obtaining a first set of control properties 304 for the brandmark 302. The first set of control properties may be encoded in a software construct and include attributes such as: color, size, position, special action(s), and/or constraints. For example, the first set of control properties 304 may specify that the brandmark 302 is rendered only in black or white colors and in the center of a digital asset. The first set of control properties 304 may further specify that the brandmark 302 cannot be combined with another logo e.g., a competing brandmark. The first set of control properties 304 may prohibit the brandmark 302 from being obscured by another digital asset, for example, as illustrated in the second metaverse environment 250 of FIG. 2B.

At 356, the second set of control properties 324 are generated independent of the first set of control properties 304. The second set of control properties 324 define how the asset behaves in the metaverse. In one example embodiment, the second set of control properties 324 may include one or more attributes of the digital asset 322, such as permitted colors, sizes, dimensions, locations. The second set of control properties 324 may further include one or more actions or behaviors of the digital asset 322. For example, add a sound effect when the digital asset 322 first appears in the metaverse environment. As another example, the digital asset 322 is greyed out when it appears alone in the metaverse environment, e.g., in a virtual closet and blinks when it is associated with an avatar, e.g., the avatar puts it on, in the metaverse environment.

Additionally, the second set of control properties 324 may further include one or more characteristics of the metaverse environment in which the digital asset 322 is to be rendered, and/or at least one fallback position if the digital asset 322 cannot be rendered.

As an example, the digital asset 322 cannot be worn by an avatar in a virtual meeting room of a metaverse environment since the shirt is casual and is not appropriate for engaging in business related activities. As such, if the avatar is in the virtual meeting room and/or a virtual business office, the digital asset 322 is not rendered. Instead, one of the fallback positions may be obtained from the second set of control properties 324. The fallback positions may indicate that the digital asset 322 is to be replaced with alternative digital asset(s), such as a formal shirt with a tie, and/or may specify to render the avatar as is without the digital asset 322.

In one example, the user may be provided with an option to select one or more of the available remedial actions, e.g., wear a first alternative digital asset, a second alternative digital asset, or simply omit the digital asset 322.

As yet another example, the fallback position may specify that the digital asset 322 is to be rendered without the brandmark 302 (exclude the brandmark 302) because e.g., the brandmark 302 is inappropriate in a business setting. Moreover, the second set of control properties 324 may be granularly defined such that when the avatar enters an office building, the brandmark 302 is not rendered with the digital asset 322 and when the avatar enters a meeting room in the virtual office building, the digital asset 322 also disappears as it is no longer appropriate or is replaced with an alternative digital asset.

Since the digital asset 322 is to include the brandmark 302, a link or reference to the brandmark 302 may be added to the second set of control properties 324. While in one example embodiment, the first set of control properties 304 may be integrated into the second set of control properties 324, in another example embodiment, only a link or a reference is included. This allows each owner to independently control their respective digital asset and use of these assets. For example, based on telemetry data about the use of the respective digital asset, the owner may change or update respective control properties. By including a link and/or a reference to the first set of control properties 304, it is ensured that the latest version of the control properties of the brandmark 302 are applied when rendering the digital asset 322.

At 358, the first set of control properties 304 and the second set of control properties 324 are stored in the control properties database 330, i.e., written in a secure manner into a rules database. The second set of control properties 324 include a reference to the first set of control properties 304.

With continued reference to FIGS. 1, 2A, 2B, and 3, FIG. 4 is a sequence diagram illustrating a method 400 of rendering a digital asset with a brandmark in a metaverse environment, according to an example embodiment. The method 400 involves the brandmark 302, the first set of control properties 304, the digital asset 322, the second set of control properties 324, and the control properties database 330 of FIG. 3.

The method 400 is performed by a rendering engine 420 that has a policing agent 430 incorporated therein, according to one example embodiment. The rendering engine 420 may be executed by one or more computing devices and is part of the metaverse middleware 150 of FIG. 1 e.g., the rendering engine 152*a* and the policing agent 154. The rendering engine 420 generates a digital representation 412 of the digital asset 322 with the brandmark 302 in a metaverse environment 410.

The method 400 involves at 440, receiving, by the rendering engine 420, which may be a visual rendering engine, a request to generate the digital representation 412 of the digital asset 322 with the brandmark 302. The request is generated from one of the metaverse applications 110 of FIG. 1. The request is to generate the digital representation 412 of the digital asset 322, which is a combination of the brandmark 302 and the digital asset 322 itself in the metaverse environment 410.

At 442, the rendering engine 420 queries the control properties database 330 for the first set of control properties 304 associated with the brandmark 302 and the second set of control properties 324 associated with the digital asset 322. In one example embodiment, the rendering engine 420 obtains and analyzes the second set of control properties 324, determines that the brandmark 302 is to be included, and then obtains the first set of control properties 304 based on the information about the brandmark 302 in the second set of control properties 324.

At 444, the rendering engine 420 obtains the first set of control properties 304 and the second set of control properties 324 (retrieved from the control properties database 330).

At 446, the policing agent 430 determines whether the digital asset 322 is compatible with the brandmark 302 based on the first set of control properties 304 and the second set of control properties 324. That is, the combined control properties are evaluated by the policing agent 430.

In one example embodiment, the policing agent 430 determines whether the digital asset is compatible with the brandmark by transforming, using a hash, the first set of control properties 304 and the second set of control properties 324 into a contract that represents a third set of combined control properties identifying the integration of the digital asset 322 with the brandmark 302. The policing agent 430 then generates a matching hash based on the third set of combined control properties (in the contract) and the digital asset 322 with the brandmark 302 rendered in the metaverse environment 410 and validates that the digital representation 412 complies with both the first set of control properties 304 and the second set of control properties 324, based on the matching hash.

In one example embodiment, as part of the validating process, the rendering engine 420 obtains contextual information about the metaverse environment 410 and provides the contextual information to the policing agent 430. Contextual information about the metaverse environment 410 includes the type of the virtual environment such as 18+ rated (virtual bar), child friendly, business environment, gaming environment, etc. The policing agent 430 evaluates these elements or characteristics of the metaverse environment 410 with respect to the first set of control properties 304 and the second set of control properties 324 (combined control properties in the contract) and determines if rendering of the digital asset 322 with the brandmark 302 is appropriate.

For example, the policing agent 430 may constrain the rendering engine 420 to generate the digital representation 412 of the digital asset 322 without the brandmark 302 based on the metaverse environment 410 being an office building. The policing agent 430 may further monitor the metaverse environment 410 continuously, at predetermined intervals, on demand, or based on detecting a change in the metaverse environment 410 to determine if any reconfigurations are required. That is, based on determining that the metaverse environment 410 no longer complies with the second set of control properties 324, the policing agent 430 may obtain a fallback position from the second set of control properties 324 and instruct the rendering engine 420 to reconfigure the metaverse environment 410 (the digital representation 412) based on the remedial actions of the fallback position. The remedial actions may include rendering an alternative asset (business shirt with a tie) instead of the digital asset 322 or excluding a logo (the brandmark 302) from the digital asset 322. The rendering engine 420 configures or reconfigures the metaverse environment 410 based on the control properties.

In one example embodiment, the policing agent 430 mathematically transforms the control properties using a hash into a contract representing the confirmed conflict-free set of control properties that govern the resulting digital representation 412 that includes all digital assets to be rendered in the metaverse environment 410 (avatar, the digital asset 322 with the brandmark 302). When the rendering engine 420 generates the digital representation 412, the rendering engine 420 also executes the policing agent 430 that determines compatibility of the avatar, the digital assets, and/or brandmarks in the metaverse environment 410. A matching hash between control properties and the rendered assets offers a verifiable confirmation of adherence to the usage rules of the respective owners. With this confirmation, the digital representation 412 (e.g., the avatar) may be rendered with the digital asset 322 present as clothing on the avatar and with the brandmark 302 affixed to the digital asset 322. The metaverse environment 410 may be reconfigured when it does not comply or no longer complies with the control properties.

With continued reference to FIGS. 1-4, FIG. 5 is a sequence diagram illustrating a method 500 of applying control policies to prevent a rendering engine from rendering a digital asset in a metaverse environment based on one or more conflicts, according to an example embodiment.

Figure 3:
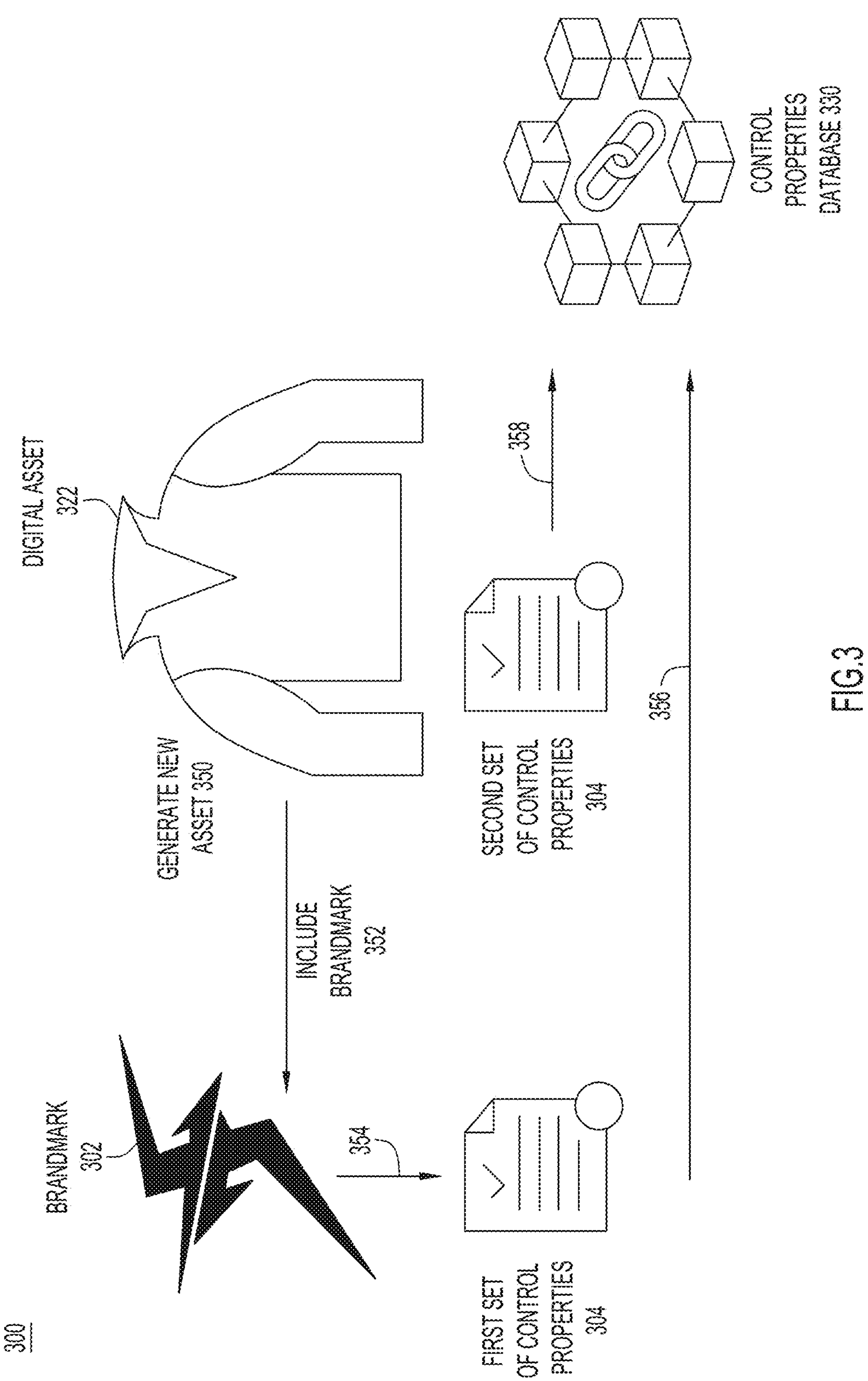
FIG. 3 is a sequence diagram illustrating a method of generating a new digital asset for a metaverse environment, according to an example embodiment.
Figure 4:
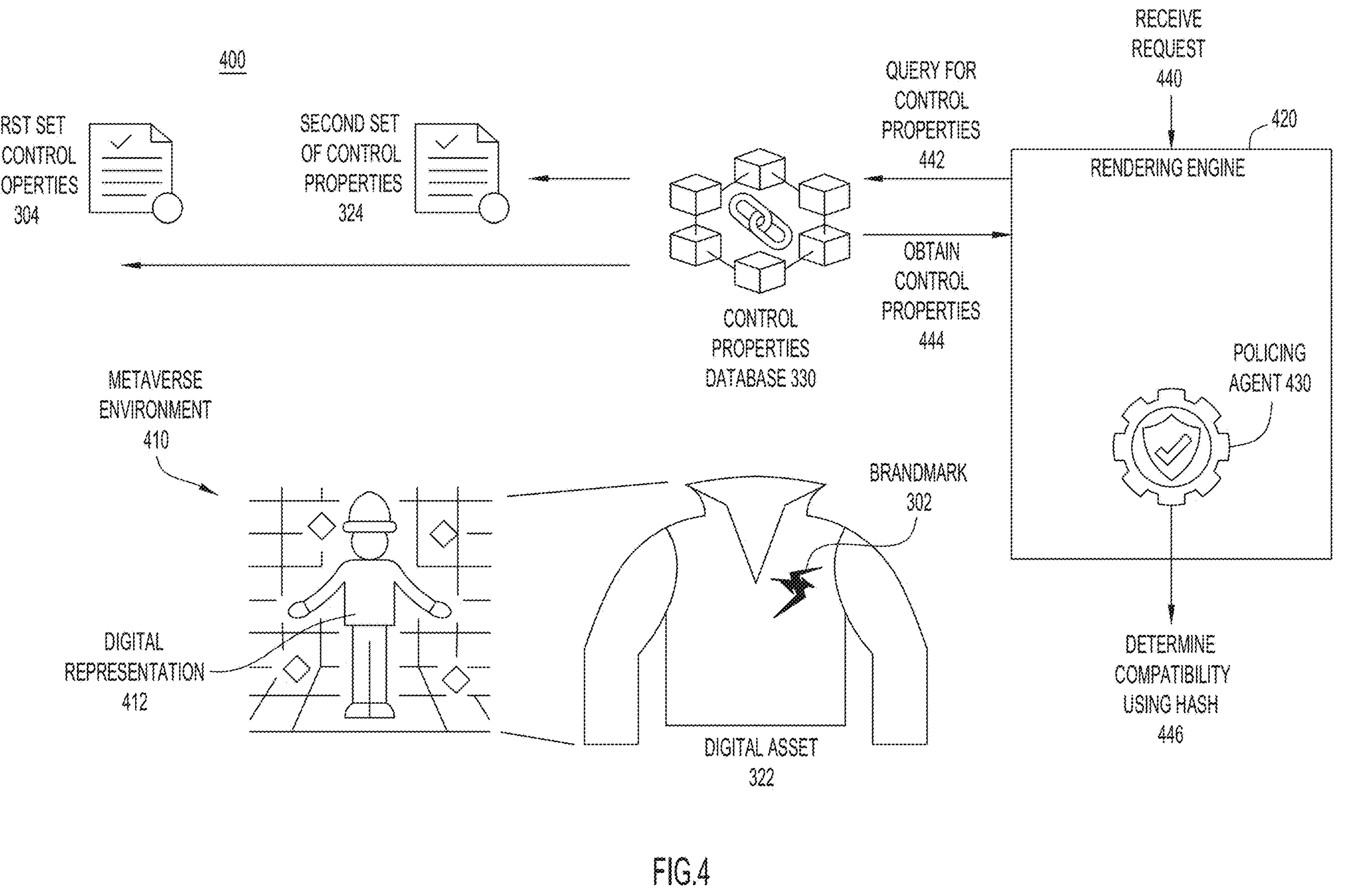
FIG. 4 is a sequence diagram illustrating a method of rendering a digital asset with a brandmark in a metaverse environment, according to an example embodiment.

The method 500 involves the digital asset 322 with the brandmark 302 of FIGS. 3 and 4, a set of combined control properties 502 such as the ones described in FIG. 4, an additional digital asset 506 with an additional set of control properties 504, and the control properties database 330 of FIGS. 3 and 4. The additional digital asset 506 may be a helmet, generated using the method 300 of FIG. 3.

The method 500 is performed by the rendering engine 420 that has the policing agent 430 incorporated therein, described in FIG. 4. The rendering engine 420 generates a digital representation 512 of the digital asset 322 with the brandmark 302 but without the additional digital asset 506 in a metaverse environment 510. In one example embodiment, the digital representation 512 is visually the same as the digital representation 412 of FIG. 4. The rendering engine 420 further generates telemetry data 530 indicative of one or more detected conflicts.

The method 500 includes at 520, the rendering engine 420 receiving a request (from a user or a metaverse application) for generating the digital representation 512 for the metaverse environment 510 in which an avatar is wearing both the digital asset 322 with the brandmark 302 and the additional digital asset 506.

At 522, the rendering engine 420 queries and obtains from the control properties database 330, attribute lists (sets of control properties) relating to each digital asset (including the avatar) that are to be rendered in the metaverse environment 510. Specifically, the rendering engine 420 obtains a set of combined control properties 502 which include the first set of control properties 304 and the second set of control properties 324. The rendering engine 420 further obtains the additional set of control properties 504 for rendering the additional digital asset 506. The rendering engine 420 provides the obtained attribute lists to the policing agent 430.

At 524, the policing agent 430 evaluates the set of combined control properties 502 and the additional set of control properties 504 and attempts to generate a combined set of these properties i.e., determines compatibility using a hash. The policing agent 430 detects that a conflict exists between the set of combined control properties 502 and the additional set of control properties 504. In one example embodiment, the rendering engine 420 may also provide contextual information about the metaverse environment 510 being rendered (e.g., 18+ or child friendly).

If the policing agent 430 determines that the control properties conflict with each other, for example, no use of the additional digital asset 506 in an 18+ rated metaverse environment, the transformation fails, at 526. The additional digital asset 506 is not rendered in the metaverse environment 510. That is, the digital representation 512 excludes the additional digital asset 506.

Additionally, since a positive, conflict-free set of control properties cannot be generated, the rendering engine 420 and/or the policing agent 430 determines a fallback position, i.e., the remedial action(s). This may result in a request being pushed to the avatar's owner or may result in a revision to the additional digital asset 506, for example, the additional digital asset 506 may be replaced with an alternative piece of headgear. The additional set of control properties 504 may define a fallback position as using a replacement digital asset 514 (e.g., a headset) instead of the additional digital asset 506. The rendering engine 420 then obtains another set of control properties (not shown) for the replacement digital asset 514 to determine compatibility. If the replacement digital asset 514 is also not compatible, another fallback position may be obtained from the additional set of control properties 504, e.g., generate the digital representation 512 to exclude the additional digital asset 506 without any replacements.

In one or more example embodiments, the fallback position defines one or more remedial actions such as excluding the additional digital asset 506, rendering the digital asset 322 without the brandmark 302, not rendering the digital asset 322 because another brandmark (not shown) is present at the same time and creates a conflict, removing the digital asset 322 when the virtual environment no longer complies with control properties, etc.

In addition to controlling use and rendering of various digital assets including avatars, the rendering engine 420 may further generate telemetry data 530.

In one example embodiment, the telemetry data 530 is generated each time a conflict is detected to record metadata about the conflict such as conflicting assets and/or brandmarks, virtual environment, timestamp, other assets present, etc. The telemetry data 530 is then analyzed using machine learning (ML), for example, to detect trends and to generate insights. The insight may suggest that the brandmark owner reviews a control property clause associated with head gear digital assets in the first set of control properties 304 because a predetermined number of conflicts were detected in which the brandmark 302 is not rendered although it would not be obscured by the head gear. As another example, the insight may recommend revising a control property clause in the first set of control properties 304 to allow rendering of the brandmark 302 when a majority of the brandmark 302 is not obscured. This insight may be generated based on detecting a predetermined number of conflicts with another digital asset resulting in the brandmark 302 being excluded.

These are just some examples of the telemetry data 530 based on which one or more insights are generated. The telemetry data 530 may include data about rendering of a respective digital asset with other digital assets, virtual environments in which they are rendered, timestamps with date, time, and location, etc. The telemetry data 530 enables insights into the use of digital assets, brandmark conflict situations, user behavior, etc. This in turn may result in changes of control properties. Specifically, at 532, insights from the telemetry data 530 result in a change of a control property in the additional set of control properties 504. That is, the brandmark owner or a digital asset owner, using a user device, may update one or more control property clauses and store the updated set of control properties in the control properties database 330.

In one example embodiment, insight may be indicative of an abuse of a brandmark and the additional control properties 504 may be changed automatically without involving the owner or user. That is, the asset creator is not able to update the control properties database 330, since the control properties therein are "fixed". However, the additional control properties 504 may be modified to effectively remove the brandmark 302 in the case where abuse is detected. The owner is then informed of this action.

The techniques presented herein provide for setting of control properties for use, rendering, and/or displaying of digital assets (including avatars) and/or brandmarks in metaverse environments. Owner restrictions, conditions, and/or policies in a form of control properties are enforced in advance. These control properties prevent display or use of a brandmark and/or a digital asset in non-permitted settings and/or use case scenarios. Similar to the physical world, the owners are provided with control mechanisms to define who, when, and how may use their brandmarks and/or digital assets. Thus, the owners are encouraged to render digital assets and/or brandmarks in metaverse environments. The owners are assured that the digital assets are used in accordance with their policies and rules and comply with their requirements. Brand reputation and image are maintained and the owners are empowered with control over their digital assets. The owners prevent abuse of their digital assets and/or brandmarks by constraining use case scenarios in which the digital assets are rendered. Additionally, the techniques presented herein generate telemetry data, which is then leveraged as insights pertaining to use and abuse of the branded digital assets. Based on these insights, changes to one or more control properties could be made.

In some cases, knowing a "chain of custody" of a digital asset may be more valuable than the digital asset itself. A digital asset may gain value based on which avatar used it or when it was used (in which event or occurrence) in metaverse. There is a desire to prove the authenticity of "shirt worn by soccer player-X in game-Y against team-Z" and the chain of custody through which the item has passed. In metaverse, this could manifest itself as the shield used by player X in tournament Y in final match against team Z.

The techniques presented herein further provide a mechanism for verifying ownership and authenticity of digital assets including avatars and brandmarks using entity tokens. The techniques presented herein further verify the chain of title of the digital asset in a privacy preserving manner using experience tokens in a form of a chain of metadata.

Cryptographically secure digital "wallets" allow for associating digital assets (represented by digital tokens or entity tokens) with a particular "owner". For example, in blockchain-based systems, an asset may be represented as a Non-Fungible Token (NFT). When the token is created, the token is "sent" to the wallet address of the originator, with the transaction being signed. The wallet address provides the "root" for the token but does not offer an authenticated identity of the originator. If the asset is sold, the token moves from seller to buyer, the transaction records the sending and receiving wallets but does not validate the identity of the seller and/or buyer. An owner may prove ownership of an asset by publishing their wallet's public address that contains the token. However, this is counter to the perceived benefits of providing anonymity using these wallets.

In metaverse environments, users may be represented by avatars. Since there is currently no verification of the end-user's identity (or whether the avatar is owned by a human user as opposed to being an NPC or a bot) that other users within the metaverse environment can utilize, the use of avatars acts as a layer of identity obfuscation. Indeed, in some cases, a perceived benefit of such environments is the anonymity that obfuscation provides.

As in the physical world, provenance of digital assets is an area that attracts forms of deception. The techniques provided herein enable entities (individuals, non-playing characters (NPCs) or software driven entities) to verify the authenticity of a digital asset, its "chain of custody" including activities of the digital asset, and/or the identity of the owner. In other words, the techniques presented herein verify ownership of a digital asset in a metaverse environment, e.g., worn by an avatar in event A and the lineage of the asset's "chain of custody". The techniques presented herein further trace ownership, use, and/or authenticity of a digital asset.

Specifically, a digital wallet is generated and is identifiable through a public "address". The digital wallet is a secure storage mechanism that is accessible using a private key of a respective owner (a user or a respective metaverse application such as the metaverse applications 110 of FIG. 1). Ownership of the digital wallet is proven by the ability to unlock the digital wallet using the private key, thus preserving privacy of the owner. The digital wallet is used to store one or more digital assets using entity tokens and one or more experience tokens that are bound to respective digital assets and are also signed by the private key. The experience tokens trace occurrences of events e.g., lifecycle events, of the digital asset. By using entity tokens and/or experience tokens, ownership, authenticity, and use of a digital asset are verified and thus transfer may be performed more readily and with confidence. The verified and/or authenticated digital asset may securely be transferred to another digital wallet of a different user with confidence and while still preserving privacy of the users.

Figure 6:
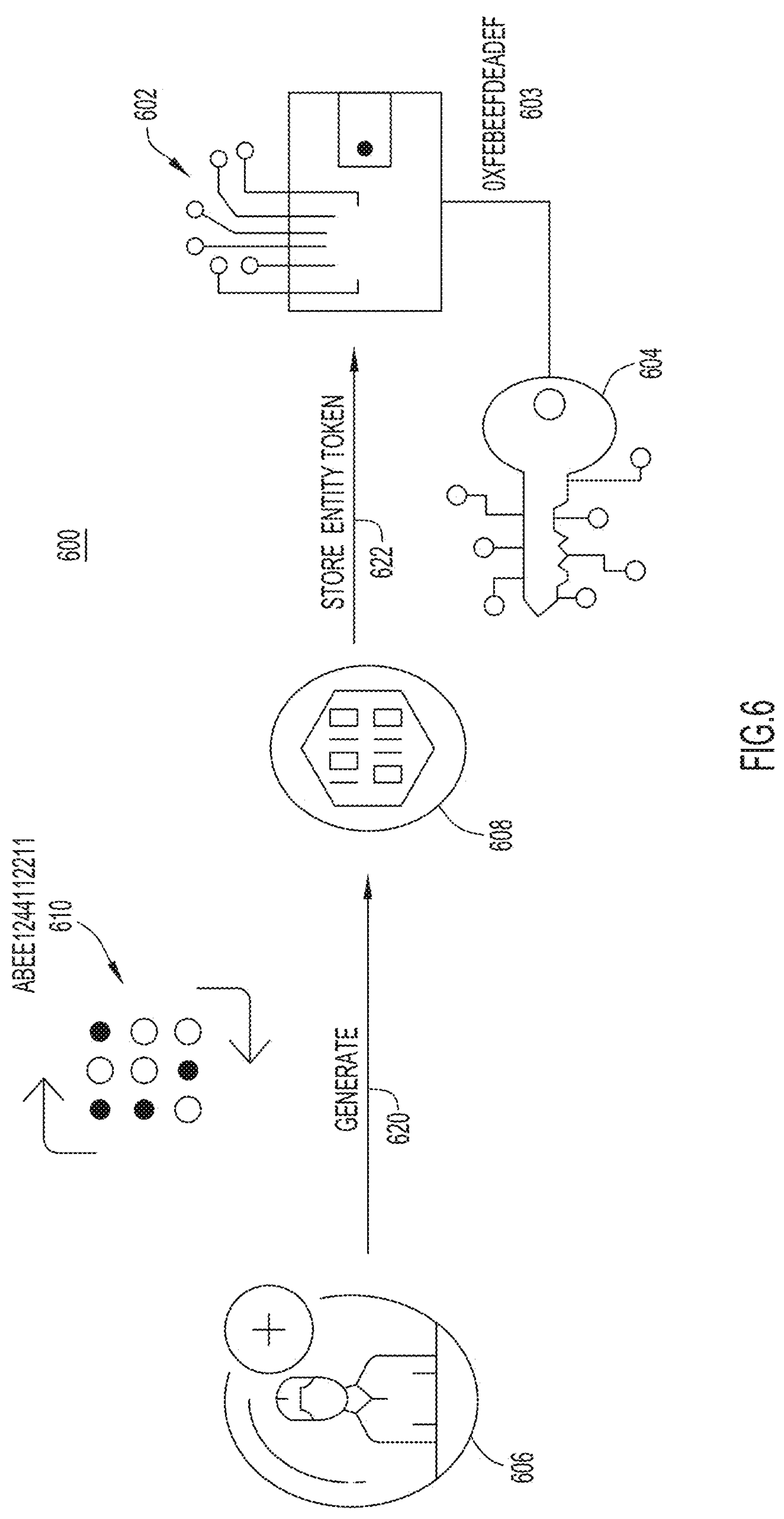
FIG. 6 is a sequence diagram illustrating a method of binding a digital asset to a digital wallet, according to an example embodiment.

With continued reference to FIG. 1, FIG. 6 is a sequence diagram illustrating a method 600 of binding a digital asset to a digital wallet, according to an example embodiment. The method 600 involves a digital wallet 602, a private key 604, and a digital asset 606 that is represented by an entity token 608 with a unique address 610 therein. The method 600 may be implemented by one or more computing devices and/or the metaverse middleware 150 of FIG. 1.

The digital wallet 602 is a cryptographically secure storage that is unlocked, opened, and/or accessed using the private key 604 of the user (owner). The digital wallet 602 is identified using a public address 603. The digital asset 606 may be an avatar, an item, or an element associated with the avatar, and/or a brandmark, such as the ones described above in FIGS. 2A-5. In one example embodiment, the digital asset 606 is an avatar.

The method 600 involves at 620, generating the digital asset 606 (the avatar) by generating the entity token 608. The entity token 608 is unique i.e., includes the unique address 610 of the digital asset 606.

At 622, the entity token 608 is provided or sent to the digital wallet 602 using the public address 603, which is then stored in the digital wallet. Thus, a binding is generated between the entity token 608 and the digital wallet 602. The transaction is signed using the private key 604, thus validating the authenticity of the binding. The entity token 608, stored in the digital wallet 602, includes the transaction of generating the entity token 608 i.e., a lifecycle event for the digital asset 606. The transaction captures metadata about the occurrence of this lifecycle event (i.e., creation).

For authentication, when a user enters a metaverse environment, the user may be required to activate the digital asset 606 i.e., the avatar. The user activates the digital asset 606 in the metaverse environment by unlocking the digital wallet 602 using the private key 604, thus obtaining access to the entity token 608 with the unique address 610 therein. Based on obtaining the entity token 608, the digital asset 606 is activated or rendered in the metaverse environment.

Figure 7:
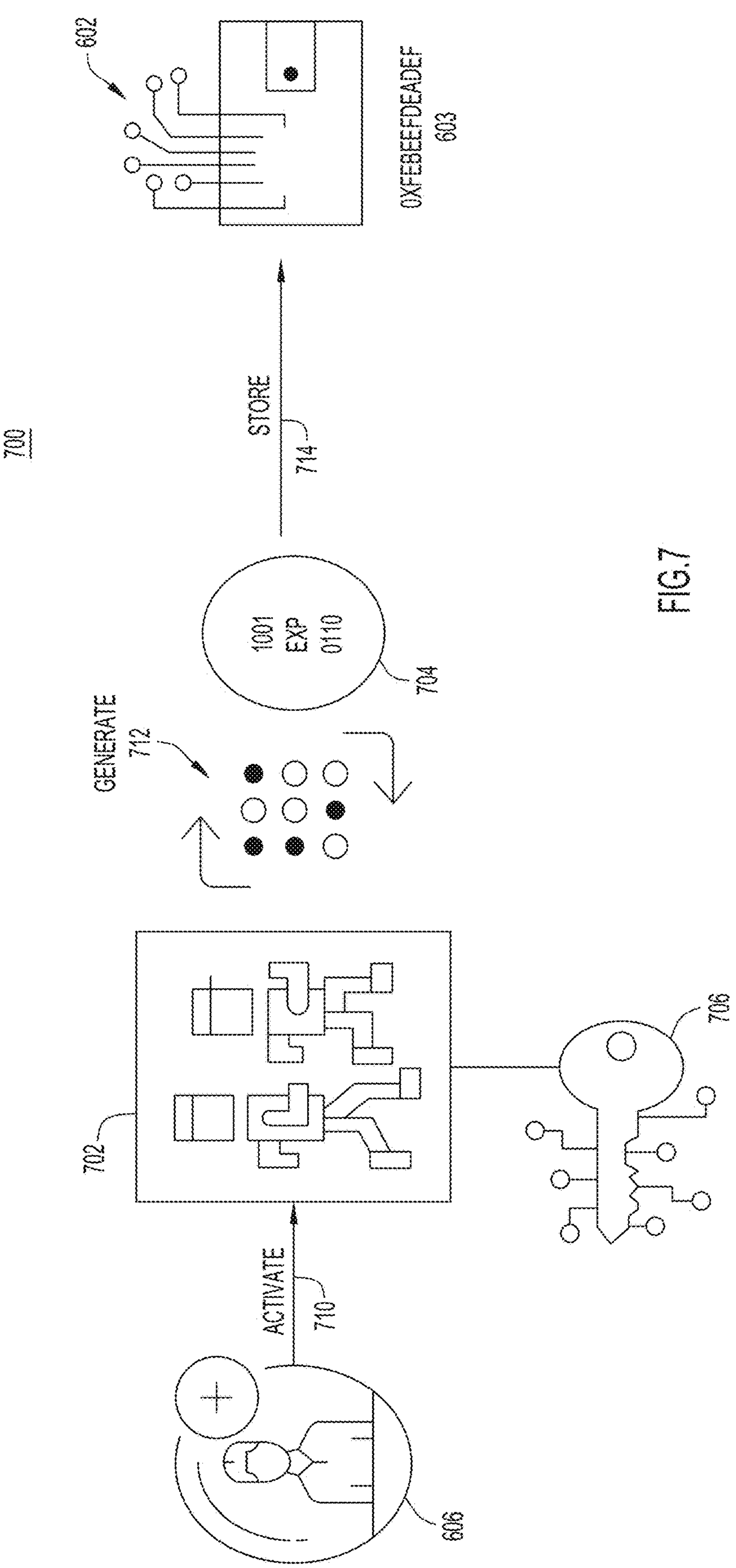
FIG. 7 is a sequence diagram illustrating a method of generating experience tokens for a digital asset, according to an example embodiment.
Figure 8:
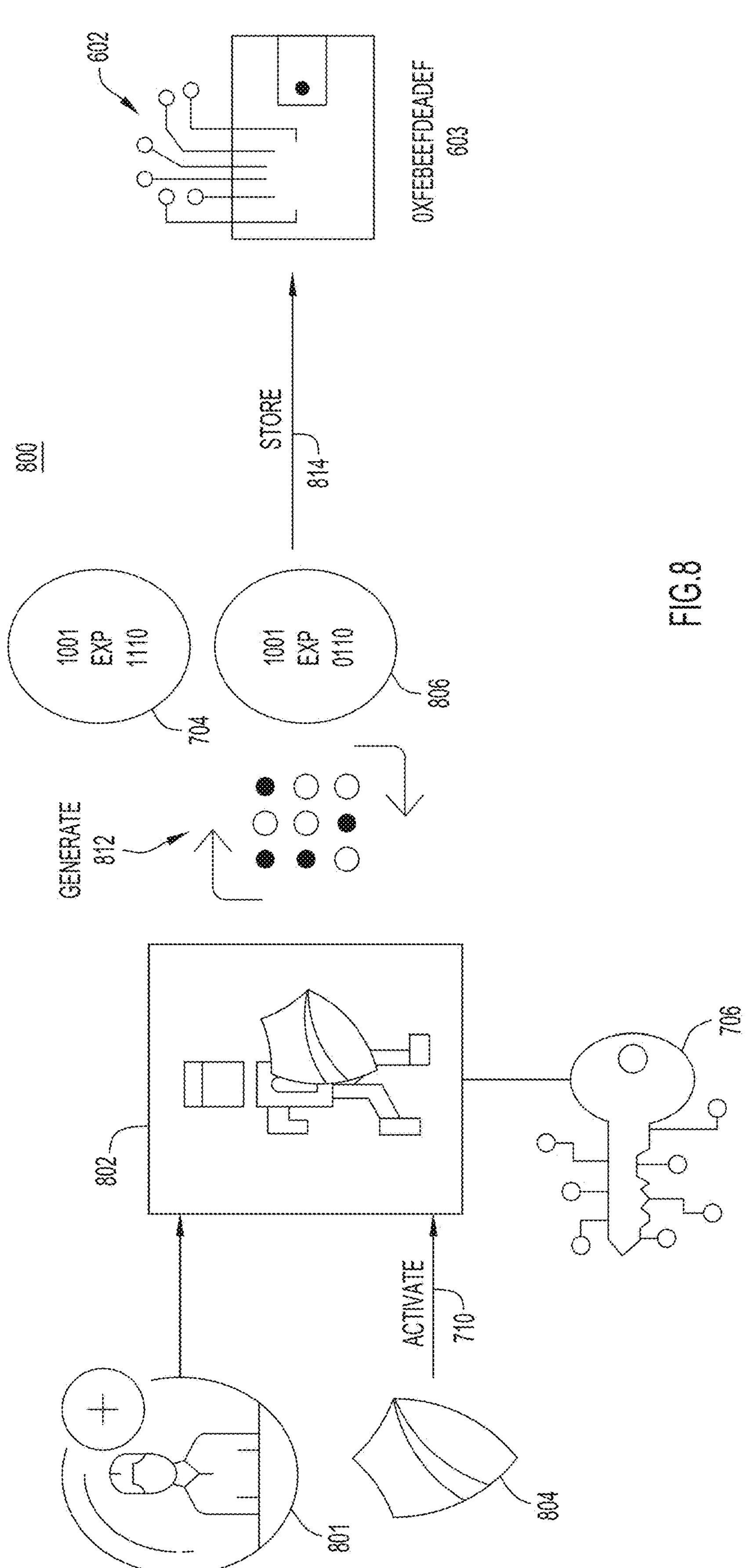
FIG. 8 is a sequence diagram illustrating a method of generating experience tokens for a digital asset associated with an avatar in a metaverse environment, according to an example embodiment.
Figure 9:
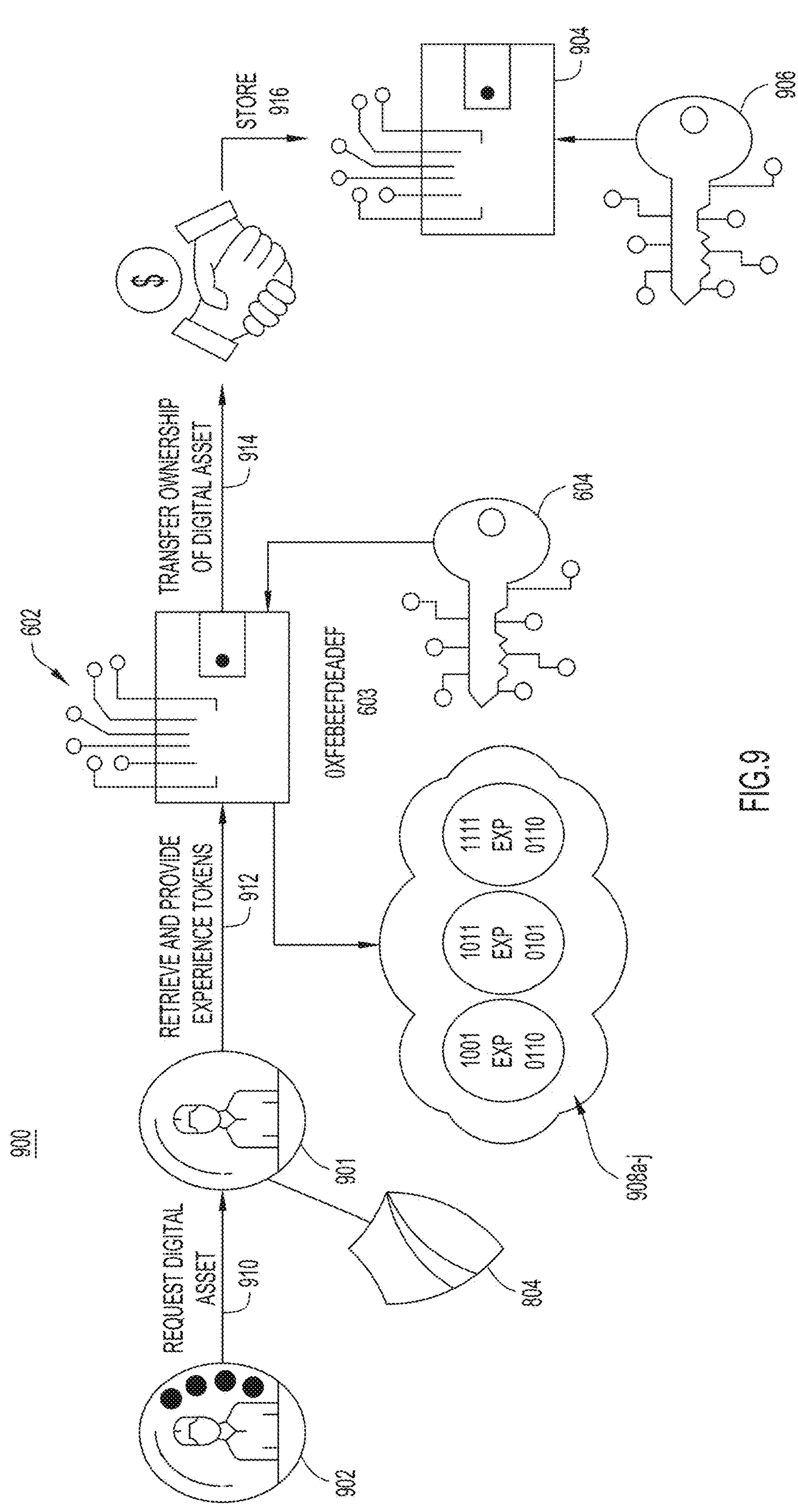
FIG. 9 is a sequence diagram illustrating a method of transferring ownership of a digital asset to another entity, according to an example embodiment.

With continued reference to FIGS. 1 and 6, FIG. 7 is a sequence diagram illustrating a method 700 of generating experience tokens for a digital asset, according to an example embodiment. The method 700 involves the digital wallet 602 and the digital asset 606 of FIG. 6. The method 700 further involves a metaverse environment 702 in which events occur and are captured using experience tokens such as an experience token 704 that is signed by a metaverse private key 706. The method 700 may be implemented by one or more computing devices and/or the metaverse middleware 150 of FIG. 1.

The method 700 involves at 710, the digital asset 606 being activated in the metaverse environment 702 and performing various activities within the metaverse environment 702. The metaverse environment 702 is rendered by a respective metaverse application that has its own private key i.e., the metaverse private key 706. The metaverse environment 702, using the rendering engine 152*a* for example, generates experience tokens associated with activities undertaken by the digital asset 606. That is, the avatar moves around the metaverse environment 702 undertaking various tasks.

As the digital asset 606 interacts in the metaverse environment 702, at 712, experience tokens are generated, represented by the experience token 704. The experience token 704 indicates an occurrence of an event and is linked to the digital asset 606.

Specifically, the experience token 704 is generated by a process within the metaverse environment 702, recording the unique address 610 in FIG. 6 of the digital asset 606, within the experience token 704 and signing it with the metaverse private key 706. These experience tokens act as an authenticated record (a chain of metadata) that captures a range of information that may include but is not limited to timestamps, environmental details, entry point details, etc. Experience tokens are cryptographically secure and verifiable. For example, the experience token 704 captures at least one timestamp related to a time the event occurred in the metaverse environment 702, at least one location where within the metaverse environment 702 the event occurred, at least one attribute of the metaverse environment 702 at the time the event occurred.

At 714, the experience token 704 is then stored in the digital wallet 602 (using the public address 603). The experience token 704 is bound to the unique address 610 of the digital asset 606. The experience tokens stored in the digital wallet 602 provide a form of verifiable audit trail for the avatar that are examined to increase the level of trust that the avatar is "alive". The experience tokens further provide a trace of activities undertaken and/or usage of the digital asset 606. When the user exits the metaverse environment 702, the digital wallet 602 is closed and/or locked.

When the digital asset 606 is "active" in the metaverse environment 702, experience tokens are generated for activities undertaken by the digital asset 606 (the avatar). Additionally, the digital asset may wear and/or use various digital items (other digital assets) and the experience tokens are also generated for these other digital assets. As with the experience tokens for avatars, asset experience tokens are also cryptographically secure and verifiable. The experience token records the avatar's address as well as other information such as timestamps, environmental details, game details, etc.

With continued reference to FIGS. 1, 6, and 7, FIG. 8 is a sequence diagram illustrating a method 800 of generating experience tokens for a digital asset associated with an avatar in a metaverse environment, according to an example embodiment.

The method 800 involves the digital wallet 602 and an avatar 801 such as the digital asset 606 of FIGS. 6 and 7. The method 800 further involves a metaverse environment 802 in which the avatar 801 uses another digital asset 804 (e.g., a shield). For example, the avatar 801 uses the shield for protection in a gaming virtual environment. The avatar's interactions are recorded as experience tokens, such as the experience token 704 of FIG. 7 and are also recorded as experience tokens associated with the other digital asset 804, represented by an experience token 806. The experience token 806 is also signed by the metaverse private key 706 of FIG. 7. The method 800 may be implemented by one or more computing devices and/or the metaverse middleware 150 of FIG. 1.

The method 800 involves at 810, activating the other digital asset 804 e.g., the avatar 801 takes the shield in the metaverse environment 802. That is, the avatar 801 retrieves the other digital asset 804 for use in the metaverse environment 802. This event may be recorded as a first experience token for the avatar 801 and as a second experience token for the other digital asset 804. These tokens are then stored in the digital wallet 602.

When the avatar 801 uses the other digital asset 804 in the metaverse environment 802 (e.g., uses the shield in a game), at 812, the metaverse environment 802 generates experience tokens indicative of an occurrence of this event. These experience tokens are generated for each digital asset in the metaverse environment 802 and are signed by the metaverse private key 706.

For example, the experience token 704 is generated for the avatar 801 and the experience token 806 is generated for the other digital asset 804. The policing agent 154 of FIG. 1 may compare the experience token 806 of the other digital asset 804 with the experience token 704 of the avatar 801 and determine that the other digital asset 804 was used by the avatar 801 in the metaverse environment 802 for a particular gaming event.

As another example, the avatar 801 may write a note on a virtual whiteboard (another digital asset) in a virtual meeting room. This note may be considered as an event by the rendering engine 152*a* of FIG. 1. As such, a first experience token is generated for the avatar 801 and a second experience token is generated for the virtual whiteboard. These experience tokens may include one or more timestamps as to when this note was written, a description of the note's content, location information, identification of the avatar 801 and the virtual whiteboard. By comparing the experience tokens, the policing agent 154 of FIG. 1 may verify that the note was written on the virtual whiteboard by the avatar 801.

At 814, the experience tokens are recorded into the digital wallet 602 that is bound to the avatar 801. The experience token 806 includes an identification of the avatar 801 and information about the occurrence of the event in which the other digital asset 804 is used by the avatar 801.

In one or more example embodiments, experience tokens provide for a chain of metadata, recording occurrence of various events such as lifecycle events in virtual environments. These tokens may be used to trace usage of the digital asset and/or verify ownership. For example, usage events for the digital assets are recorded in the digital wallet 602 such as the shield was used in a game A and/or the shirt was transferred to a different avatar (i.e., ownership transfer event when the digital asset is sold). When the digital asset is an avatar, events include participation activities such as the avatar played in a game X as well as the purchase of assets (acquired the shield at point Y in the game).

In the case of a potential digital asset sale, a potential buyer examines the experience tokens associated with the digital asset. These experience tokens provide a record of the asset's ownership history and the events in which the asset was present/participated (use of the digital asset). For example, verifying that an avatar used the shield to slay a dragon in game X. The avatar's owner is also able to make a verifiable claim in relation to the digital asset since the experience token of the avatar and the experience token of the digital asset contain the information about the same event, which are compared and thus verified.

With continued reference to FIGS. 1 and 6-8, FIG. 9 is a sequence diagram illustrating a method 900 of transferring ownership of a digital asset to another entity, according to an example embodiment.

The method 900 involves the digital wallet 602 of FIG. 6 that stores entity tokens for the digital assets of a first user and includes experience tokens for these digital assets signed by the private key 604 of the user. For example, the digital wallet 602 includes a first avatar 901 such as the avatar 801 of FIG. 8 and the other digital asset 804 of FIG. 8.

The method 900 further involves a second avatar 902 that represents a second user that is to acquire the other digital asset 804. The second avatar 902 is associated with a second digital wallet 904 and has a second private key 906. The method 900 may be implemented by one or more computing devices and/or the metaverse middleware 150 of FIG. 1.

In the method 900, at 910, the second user, using the second avatar 902, requests the other digital asset 804 from the first avatar 901. That is, the method 900 involves transferring of the other digital asset 804 from the first avatar 901 to the second avatar 902.

Based on this request, the owner of the first avatar 901 may unlock the digital wallet 602 using the private key 604 and retrieve the experience tokens 908*a*-*j* associated with the other digital asset 804. At 912, the owner of the first avatar 901 provides the experience tokens 908*a*-*j* to the potential purchaser, the second avatar 902. These may be provided in the metaverse environment in which the first avatar 901 and the second avatar 902 interact with each other.

In one example embodiment, the owner of the first avatar 901 may further choose to also publish experience tokens associated with the first avatar 901 (not shown) in a public forum such as the experience token 704 of FIG. 7. The owner of the second avatar 902 may then compare the experience tokens 908*a*-*j* with the experience tokens of the first avatar 901 to determine if the other digital asset 804 was used by the first avatar 901. By comparing the experience tokens of the first avatar 901 and the experience tokens 908*a*-*j*, the use of the other digital asset 804 by the first avatar 901 is traced and/or verified. This approach also maintains the pseudo-anonymity of the owners of the first avatar 901 and the second avatar 902 in virtualized environments, since the identity of the users (e.g., human individuals) owning and operating an avatar and other digital assets cannot be determined by the unique addresses of the avatars.

If the lineage information is accepted, at 914, the sale or transfer of ownership of the other digital asset 804 can proceed with the transaction being signed using the second private key 906. At 916, the owner of the second avatar 902 stores the other digital asset 804 in the second digital wallet 904 using the second private key 906.

In one or more example embodiments, an individual owning and operating an avatar can prove ownership of the avatar by unlocking their digital wallet using their private key and retrieving the avatar's experience tokens. Additionally, the individual owning and operating the avatar proves ownership of one or more digital assets worn or used by the avatar by unlocking their digital wallet (using their private key) that includes the entity token of the avatar with its unique address, and by providing access to experience tokens that have records of the experiences relating to the one or more digital assets, such as when, how, and by whom the digital asset was used or worn. The experience tokens of the digital assets provide a history and ownership lineage of the respective digital asset, which is cryptographically secure and verifiable.

Techniques presented herein provide for verifying ownership and authenticity of a digital asset such as an avatar or another digital asset used or worn by the avatar. The techniques presented herein further provide for tracing use and/or chain of custody of a digital asset. Additionally, the techniques provide for verifying owner identity of the digital asset in a privacy-preserving manner. Thus, sale transactions and/or transfer transactions of the digital assets in the metaverse may be performed with confidence in a secure manner.

Figure 10:
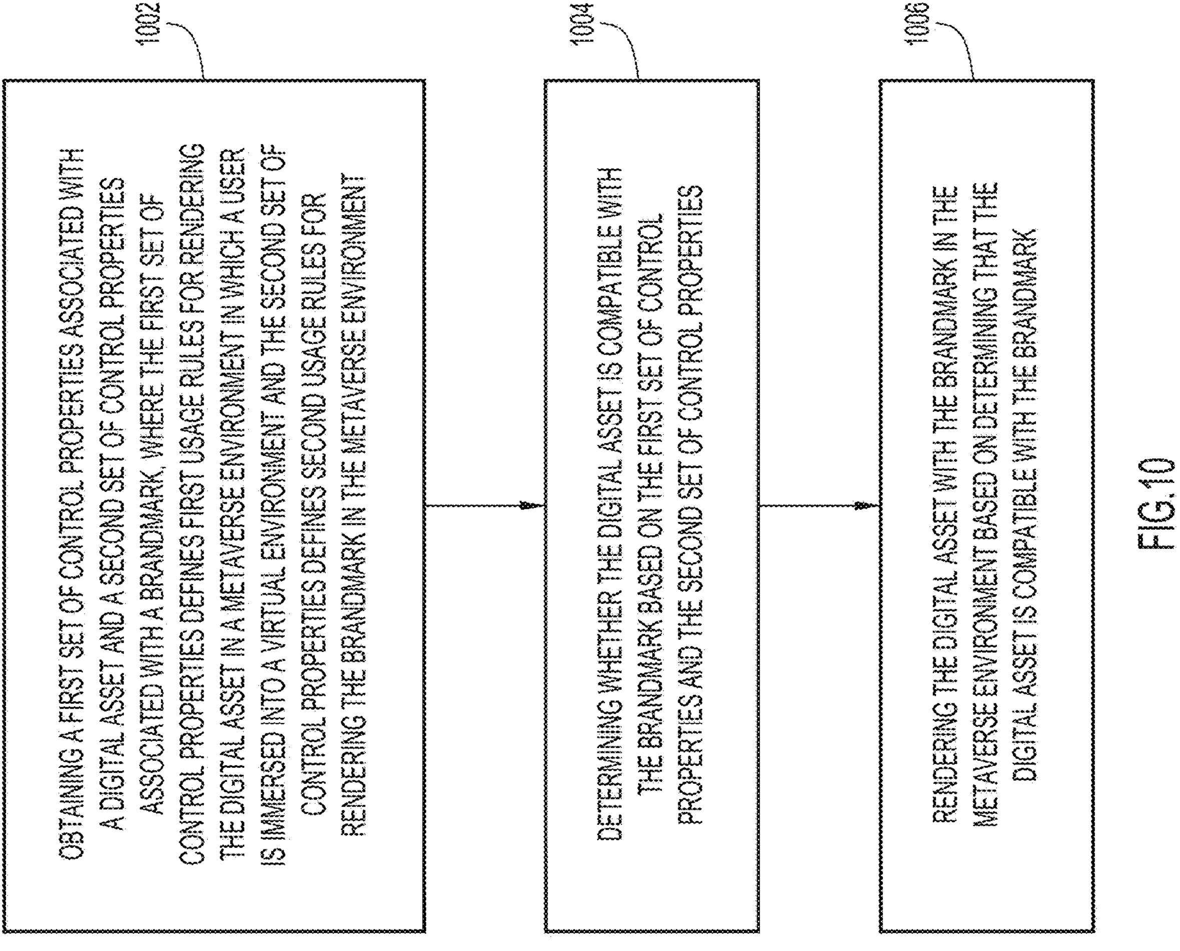
FIG. 10 is a flowchart illustrating a method of rendering a digital asset with a brandmark based on determining that the digital asset is compatible with the brandmark, according to an example embodiment.

FIG. 10 is a flowchart illustrating a method 1000 of rendering a digital asset with a brandmark based on determining that the digital asset is compatible with the brandmark, according to an example embodiment. The method 1000 may be performed by one or more computing devices. For example, the method 1000 may be performed by the rendering engine 152*a* and the policing agent 154 of FIG. 1 or the rendering engine 420 of FIGS. 4 and 5.

The method 1000 involves at 1002, obtaining a first set of control properties associated with a digital asset and a second set of control properties associated with a brandmark. The first set of control properties defines first usage rules for rendering the digital asset in a metaverse environment in which a user is immersed into a virtual environment and the second set of control properties defines second usage rules for rendering the brandmark in the metaverse environment.

The method 1000 further involves at 1004, determining whether the digital asset is compatible with the brandmark based on the first set of control properties and the second set of control properties.

At 1006, the method 1000 involves rendering the digital asset with the brandmark in the metaverse environment based on determining that the digital asset is compatible with the brandmark.

According to one or more example embodiments, the operation 1006 of rendering the digital asset with the brandmark may include generating a digital representation that includes the digital asset with the brandmark thereon based on the first set of control properties and the second set of control properties. The first set of control properties and the second set of control properties may further define attributes of combining the digital asset with the brandmark for rendering. The operation 1006 of rendering the digital asset may further include configuring the metaverse environment to include the digital representation.

In one form, the operation 1004 of determining whether the digital asset is compatible with the brandmark may include transforming, using a hash, the first set of control properties and the second set of control properties into a contract that represents a third set of combined control properties identifying an integration of the digital asset with the brandmark.

In one instance, the method 1000 may further involve generating a matching hash based on the third set of combined control properties and the digital asset with the brandmark rendered in the metaverse environment and validating that the digital representation complies with the first set of control properties and the second set of control properties, based on the matching hash.

According to one or more example embodiments, the method 1000 may further include obtaining at least one attribute of the metaverse environment and determining whether the at least one attribute of the metaverse environment complies with the first set of control properties and with the second set of control properties. The operation 1006 of rendering the digital asset may involve configuring the metaverse environment to include the digital asset based on determining that the at least one attribute of the metaverse environment complies with at least one of the first set of control properties or the second set of control properties.

In one form, configuring the metaverse environment in the method 1000 may further include reconfiguring the metaverse environment to include the digital asset without the brandmark based on determining that the at least one attribute of the metaverse environment does not comply with the second set of control properties.

In another form, the digital asset may be used or worn by an avatar rendered in the metaverse environment. The at least one attribute of the metaverse environment may include at least one other asset associated with the avatar. The operation 1004 of determining whether the at least one other asset in the metaverse environment complies with the first set of control properties and also complies with the second set of control properties may include determining whether at least one conflict exists between the brandmark and the at least one other asset based on the second set of control properties.

In one instance, the method 1000 may further involve generating the digital asset by defining the first set of control properties that include at least one of: one or more attributes of the digital asset, behavior of the digital asset, one or more characteristics of the metaverse environment in which the digital asset is to be rendered, or at least one fallback action if the digital asset cannot be rendered.

According to one or more example embodiments, the second set of control properties may define attributes of the brandmark including one or more of: color, size, and location for rendering the brandmark with respect to the digital asset, at least one action to perform in the metaverse environment based on the brandmark being rendered, or one or more characteristics of the metaverse environment in which the brandmark is not to be rendered.

In one instance, the method 1000 may further involve generating telemetry data about rendering of the digital asset in the metaverse environment at operation 1006. The method 1000 may further involve providing the telemetry data to generate at least one insight for reconfiguring at least one of the first set of control properties or the second set of control properties.

In another instance, the digital asset may be at least one item associated with an avatar rendered in the metaverse environment. The method 1000 may further include based on determining that the avatar no longer complies with the second set of control properties, obtaining a fallback position from the second set of control properties. The fallback position defines at least one remedial action to perform including one or more of: rendering an alternative asset instead of the digital asset or excluding a logo of the brandmark from the digital asset. The method 1000 may further include configuring the metaverse environment by excluding the brandmark based on the fallback position.

In yet another instance, the method 1000 may further include detecting an occurrence of an event in the metaverse environment. The event may be associated with an action of the avatar rendered with the digital asset in the metaverse environment. The method 1000 may further involve generating an experience token for the digital asset. The experience token may be indicative of the event. The method 1000 may further involve storing the experience token in a digital wallet in association with the digital asset and the avatar.

Figure 11:
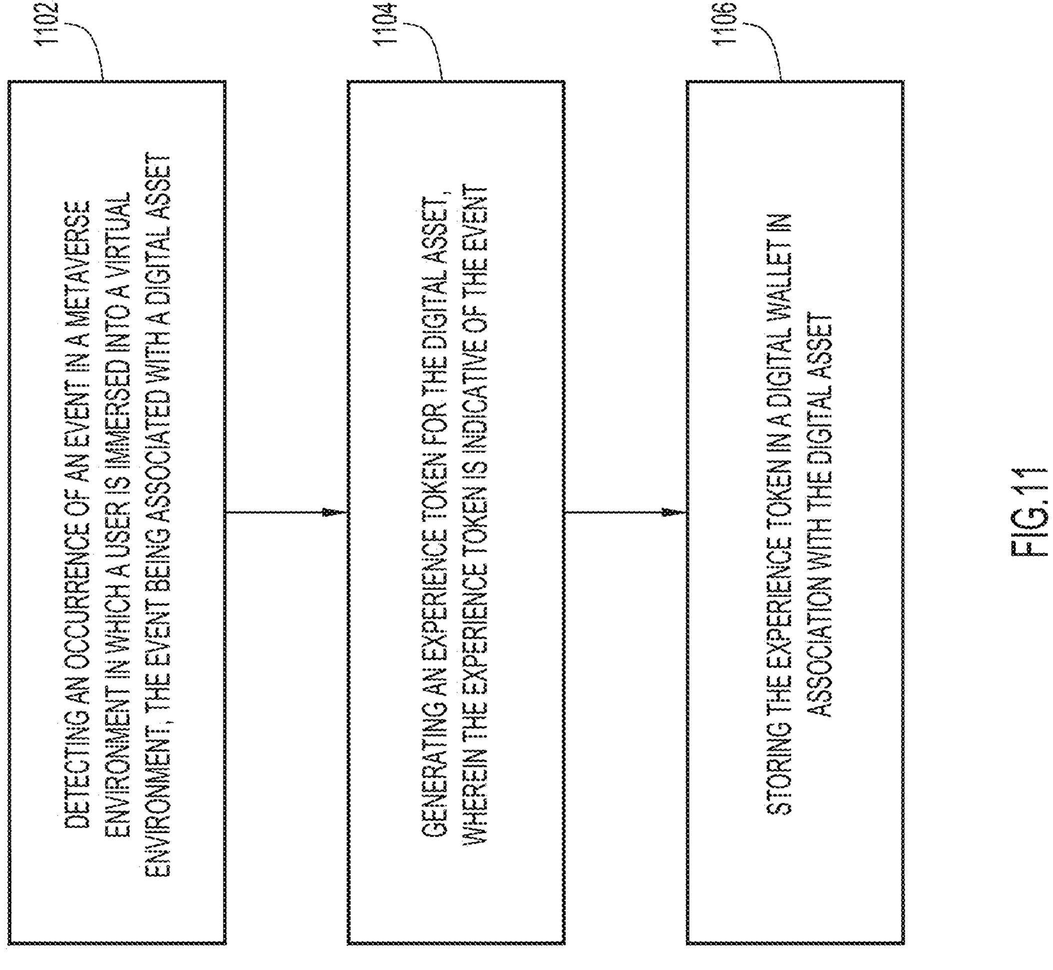
FIG. 11 is a flowchart illustrating a method of storing an experience token in a digital wallet in association with the digital asset to verify the digital asset's involvement in an event in a metaverse environment, according to an example embodiment.

FIG. 11 is a flowchart illustrating a method 1100 of storing an experience token in a digital wallet in association with the digital asset to verify the digital asset's involvement in an event in a metaverse environment, according to an example embodiment. The method 1100 may be performed by one or more computing devices. For example, the method 1100 may be performed by the policing agent 154 of FIG. 1.

The method 1100 involves at 1102, detecting an occurrence of an event in a metaverse environment in which a user is immersed into a virtual environment. The event is associated with a digital asset.

The method 1100 further involves at 1104, generating an experience token for the digital asset. The experience token is indicative of the event.

The method 1100 further involves at 1106, storing the experience token in a digital wallet in association with the digital asset.

In some aspects of one or more example embodiments, the digital asset may be used or worn by an avatar in the metaverse environment and the experience token may be a first experience token that indicates one of a plurality of lifecycle events of the avatar. The method 1100 may 1100 may further involve obtaining, from the digital wallet, information about the avatar including one or more second experience tokens associated with the plurality of lifecycle events of the avatar and verifying whether the digital asset is used or worn by the avatar in the event based on comparing the first experience token with the one or more second experience tokens.

In one instance, the digital asset may be a digital entity representation in the metaverse environment. The method 1100 may further involve obtaining, from the digital wallet, an entity token based on a private key of the user. The entity token may include information about the digital asset being activated in the metaverse environment.

In one form, the operation 1104 of generating the experience token for the digital asset may include generating a plurality of experience tokens based on a plurality of activities of the digital asset in the metaverse environment. The plurality of experience tokens may provide a chain of metadata that is signed by the private key and that associates the plurality of activities with the digital asset. The method 1100 may further involve verifying at least one of an ownership or an authenticity of the digital asset based on the entity token and the plurality of experience tokens.

In another form, the method 1100 may further involve transferring the entity token from the digital wallet to another digital wallet of a different user based on verifying the ownership of the digital asset and the authenticity of the digital asset, generating an additional experience token based on transferring the entity token to the other digital wallet, and recording the additional experience token in the other digital wallet in an association with the entity token.

In one instance, the operation 1104 of generating the experience token for the digital asset may include capturing at least one timestamp related to a time the event occurred, capturing at least one attribute of the metaverse environment at the time the event occurred, and recording, into the experience token, the at least one timestamp and the at least one attribute of the metaverse environment.

Figure 5:
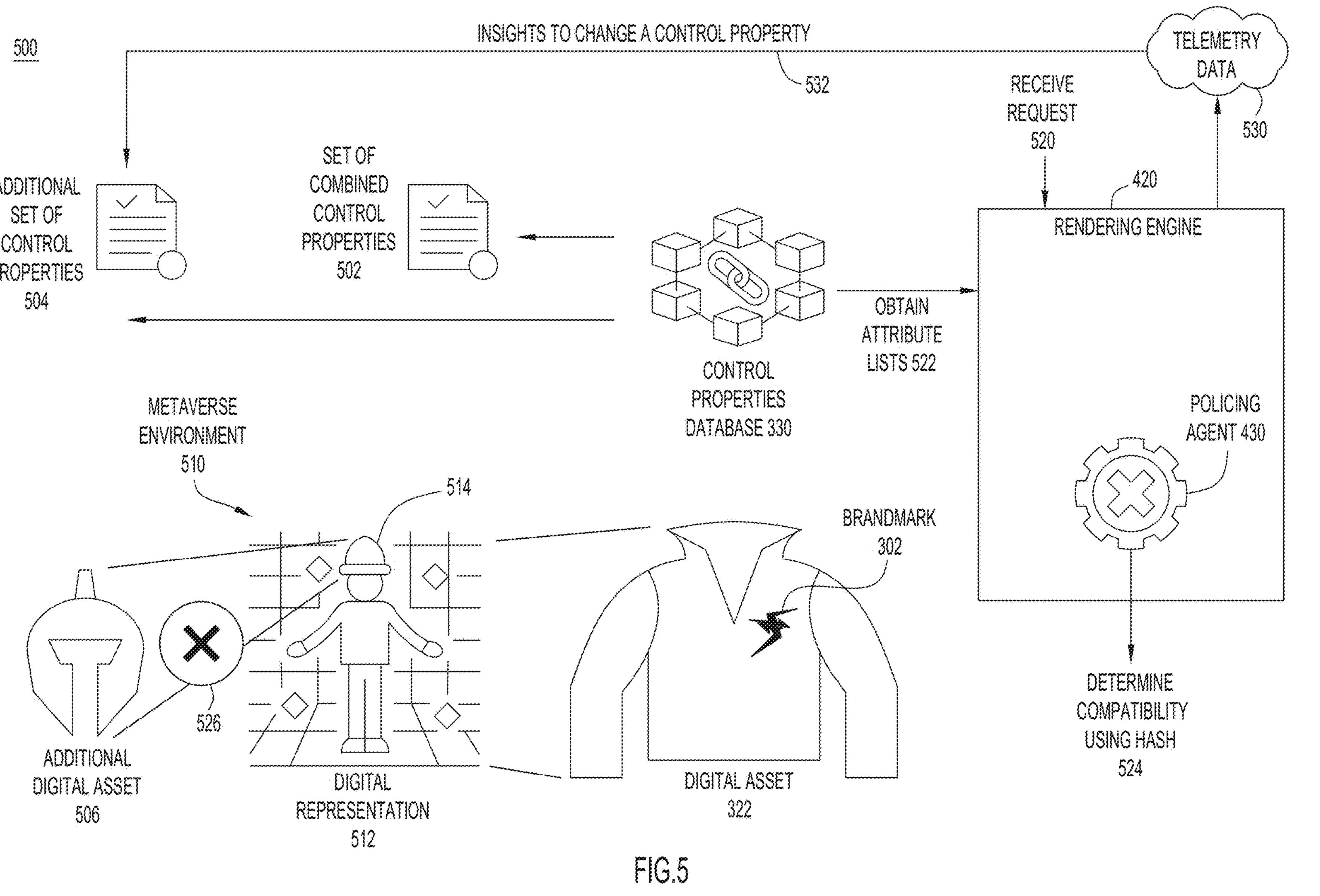
FIG. 5 is a sequence diagram illustrating a method of applying control policies to prevent rendering of a digital asset in a metaverse environment based on one or more detected conflicts, according to an example embodiment.
Figure 12:
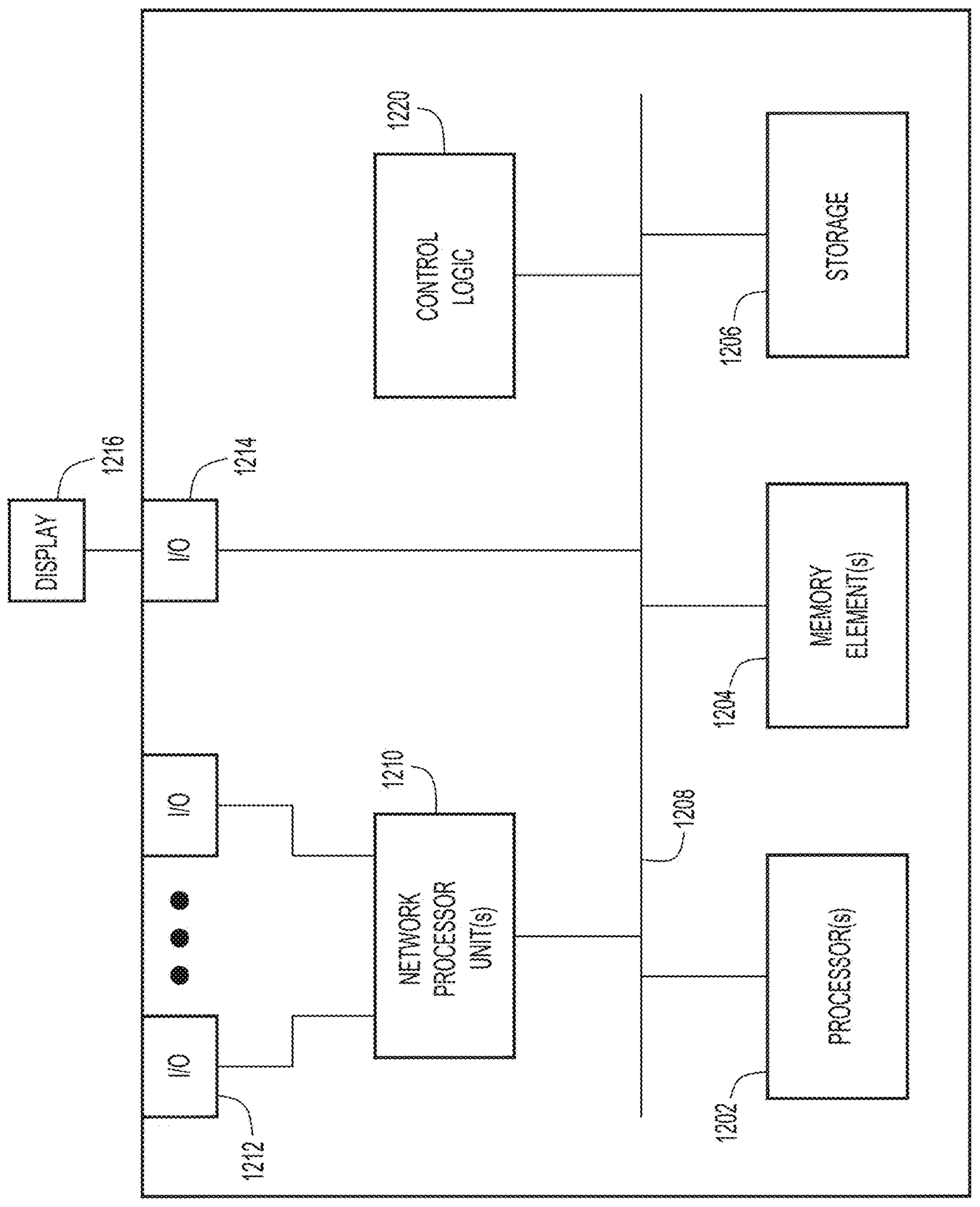
FIG. 12 is a hardware block diagram of a computing device that may perform functions associated with any combination of operations in connection with the techniques depicted and described in FIGS. 1-11, according to various example embodiments.

FIG. 12 is a hardware block diagram of a computing device 1200 that may perform functions associated with any combination of operations in connection with the techniques depicted in FIGS. 1-11, according to various example embodiments, including, but not limited to, operations of one or more user devices such as at least some of the user devices of the human-machine interface 120 of FIG. 1, the rendering engine 152*a*, the policing agent 154 of FIG. 1, or the rendering engine 420 of FIGS. 4 and 5. It should be appreciated that FIG. 12 provides only an illustration of one example embodiment and does not imply any limitations with regard to the environments in which different example embodiments may be implemented. Many modifications to the depicted environment may be made.

In at least one embodiment, computing device 1200 may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for computing device 1200 can overlap in any manner and are not limited to the specific allocation of instructions and/or operations described herein.

In at least one embodiment, processor(s) 1202 is/are at least one hardware processor configured to execute various tasks, operations, and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with one or more memory elements 1204 (or vice versa), or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1212 can be configured as one or more Ethernet port(s), Fibre Channel ports, and/or any other I/O port(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other entities that may be connected to computing device 1200. For example, I/O interface(s) 1214 may 1214 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 1216, a display screen (touch screen on a mobile device), or the like.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a communication interface to enable communication with devices operating to provide a metaverse environment and a processor. The processor is configured to perform various operations including obtaining a first set of control properties associated with a digital asset and a second set of control properties associated with a brandmark. The first set of control properties defines first usage rules for rendering the digital asset in a metaverse environment in which a user is immersed into a virtual environment and the second set of control properties defines second usage rules for rendering the brandmark in the metaverse environment. The operations further include determining whether the digital asset is compatible with the brandmark based on the first set of control properties and the second set of control properties and rendering the digital asset with the brandmark in the metaverse environment based on determining that the digital asset is compatible with the brandmark.

In yet another example embodiment, an apparatus is provided. The apparatus includes a communication interface to enable communication with devices operating to provide a metaverse environment and a processor. The processor is configured to perform various operations including detecting an occurrence of an event in a metaverse environment in which a user is immersed into a virtual environment. The event is associated with a digital asset. The operations further include generating an experience token for the digital asset. The experience token is indicative of the event. The operations further include storing the experience token in a digital wallet in association with the digital asset.

In yet another example embodiment, one or more non-transitory computer readable storage media encoded with instructions are provided. When the media is executed by a processor, the instructions cause the processor to execute a method that involves obtaining a first set of control properties associated with a digital asset and a second set of control properties associated with a brandmark. The first set of control properties defines first usage rules for rendering the digital asset in a metaverse environment in which a user is immersed into a virtual environment and the second set of control properties defines second usage rules for rendering the brandmark in the metaverse environment. The method further involves determining whether the digital asset is compatible with the brandmark based on the first set of control properties and the second set of control properties and rendering the digital asset with the brandmark in the metaverse environment based on determining that the digital asset is compatible with the brandmark.

In yet another example embodiment, one or more non-transitory computer readable storage media encoded with instructions are provided. When the media is executed by a processor, the instructions cause the processor to execute a method that involves detecting an occurrence of an event in a metaverse environment in which a user is immersed into a virtual environment. The event is associated with a digital asset. The method further involves generating an experience token for the digital asset, where the experience token is indicative of the event and storing the experience token in a digital wallet in association with the digital asset.

In yet another example embodiment, a system is provided that includes the devices and operations explained above with reference to FIGS. 1-12.

The programs described herein (e.g., control logic 1220) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1206 and/or memory elements(s) 1204 can store data, software, code, instructions (e.g., processor instructions), logic, parameters, combinations thereof, and/or the like used for operations described herein. This includes the storage 1206 and/or memory elements(s) 1204 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms refer to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A method comprising:

obtaining a first set of control properties associated with a digital asset and a second set of control properties associated with a brandmark, wherein the first set of control properties defines first usage rules for rendering the digital asset in a metaverse environment in which a user is immersed into a virtual environment and the second set of control properties defines second usage rules for rendering the brandmark in the metaverse environment;

determining whether the digital asset is compatible with the brandmark by determining whether the first set of control properties conflict with the second set of control properties;

generating a matching hash based on a set of combined control properties that include the first set of control properties, the second set of control properties, and at least one other set of control properties of at least one other digital asset, wherein the digital asset and the at least one other digital asset are associated with an avatar being rendered in the metaverse environment;

validating the avatar for rendering in the metaverse environment based on the matching hash; and rendering the digital asset with the brandmark in the metaverse environment based on determining that the digital asset is compatible with the brandmark.

2. The method of claim 1, wherein rendering the digital asset with the brandmark includes:

generating a digital representation that includes the digital asset with the brandmark thereon based on the first set of control properties and the second set of control properties, which further define attributes of combining the digital asset with the brandmark for rendering; and configuring the metaverse environment to include the digital representation.

3. The method of claim 2, wherein determining whether the digital asset is compatible with the brandmark includes:

transforming by hashing the first set of control properties and the second set of control properties into a third set of combined control properties identifying an integration of the digital asset with the brandmark.

4. The method of claim 3, wherein:

generating a matching hash comprises hashing the third set of combined control properties and the digital asset with the brandmark rendered in the metaverse environment; and validating comprises validating that the digital representation complies with the first set of control properties and the second set of control properties using the matching hash.

5. The method of claim 1, further comprising:

obtaining at least one attribute of the metaverse environment; and determining whether the at least one attribute of the metaverse environment complies with the first set of control properties and with the second set of control properties, wherein rendering the digital asset includes configuring the metaverse environment to include the digital asset based on determining that the at least one attribute of the metaverse environment complies with at least one of the first set of control properties or the second set of control properties.

6. The method of claim 5, wherein configuring the metaverse environment further includes:

reconfiguring the metaverse environment to include the digital asset without the brandmark based on determining that the at least one attribute of the metaverse environment does not comply with the second set of control properties.

7. The method of claim 5, wherein the digital asset is used or worn by an avatar rendered in the metaverse environment, wherein the at least one attribute of the metaverse environment includes at least one other asset associated with the avatar, and further comprising:

determining whether the at least one other asset in the metaverse environment complies with the first set of control properties and with the second set of control properties by determining whether at least one conflict exists between the brandmark and the at least one other asset based on the second set of control properties.

8. The method of claim 1, further comprising:

generating the digital asset by defining the first set of control properties that includes at least one of: one or more attributes of the digital asset, behavior of the digital asset, one or more characteristics of the metaverse environment in which the digital asset is to be rendered, or at least one fallback action if the digital asset cannot be rendered.

9. The method of claim 1, wherein the second set of control properties defines attributes of the brandmark including one or more of:

color, size, and location for rendering the brandmark with respect to the digital asset;

at least one action to perform in the metaverse environment based on the brandmark being rendered; and one or more characteristics of the metaverse environment in which the brandmark is not to be rendered.

10. The method of claim 1, further comprising:

generating telemetry data about rendering of the digital asset in the metaverse environment; and providing the telemetry data to generate at least one insight for reconfiguring at least one of the first set of control properties or the second set of control properties.

11. The method of claim 1, wherein the digital asset is at least one item associated with the avatar rendered in the metaverse environment, and further comprising:

based on determining that the avatar no longer complies with the second set of control properties, obtaining a fallback position from the second set of control properties, wherein the fallback position defines at least one remedial action to perform including one or more of:

rendering an alternative asset instead of the digital asset or excluding a logo of the brandmark from the digital asset; and configuring the metaverse environment by excluding the brandmark based on the fallback position.

12. The method of claim 11, further comprising:

detecting an occurrence of an event in the metaverse environment, the event being associated with an action of the avatar rendered with the digital asset in the metaverse environment;

generating an experience token for the digital asset, wherein the experience token is indicative of the event; and storing the experience token in a digital wallet in association with the digital asset and the avatar.

13. The method of claim 1, wherein determining whether the digital asset conflicts with the brandmark involves determining whether color, size and/or location defined in the second set of control properties for the brandmark are conflicting with a plurality of attributes in the first set of control properties for the digital asset.

14. The method of claim 1, wherein determining whether the digital asset is compatible with the brandmark comprises:

determining whether the brandmark is being at least partially obscured by the digital asset or another digital asset in the metaverse environment based on the second set of control properties defining that obscuring the brandmark is prohibited; or determining whether the brandmark is to be rendered with another brandmark based on the second set of control properties defining that the brandmark is not to be combined with other brandmarks.

15. An apparatus comprising:

a communication interface to enable communication with devices operating to provide a metaverse environment; and a processor configured to perform operations comprising:

obtaining a first set of control properties associated with a digital asset and a second set of control properties associated with a brandmark, wherein the first set of control properties defines first usage rules for rendering the digital asset in a metaverse environment in which a user is immersed into a virtual environment and the second set of control properties defines second usage rules for rendering the brandmark in the metaverse environment;

determining whether the digital asset is compatible with the brandmark by determining whether the first set of control properties conflict with the second set of control properties;

generating a matching hash based on a set of combined control properties that include the first set of control properties, the second set of control properties, and at least one other set of control properties of at least one other digital asset, wherein the digital asset and the at least one other digital asset are associated with an avatar being rendered in the metaverse environment;

validating the avatar for rendering in the metaverse environment based on the matching hash; and rendering the digital asset with the brandmark in the metaverse environment based on determining that the digital asset is compatible with the brandmark.

16. The apparatus of claim 15, wherein the processor renders the digital asset with the brandmark by:

generating a digital representation that includes the digital asset with the brandmark thereon based on the first set of control properties and the second set of control properties, which further define attributes of combining the digital asset with the brandmark for rendering; and configuring the metaverse environment to include the digital representation.

17. The apparatus of claim 15, wherein determining whether the digital asset is compatible with the brandmark comprises:

determining whether the brandmark is being at least partially obscured by the digital asset or another digital asset in the metaverse environment based on the second set of control properties defining that obscuring the brandmark is prohibited; or determining whether the brandmark is to be rendered with another brandmark based on the second set of control properties defining that the brandmark is not to be combined with other brandmarks.

18. One or more non-transitory computer readable storage media encoded with instructions that, when executed by a processor, cause the processor to execute a method comprising:

obtaining a first set of control properties associated with a digital asset and a second set of control properties associated with a brandmark, wherein the first set of control properties defines first usage rules for rendering the digital asset in a metaverse environment in which a user is immersed into a virtual environment and the second set of control properties defines second usage rules for rendering the brandmark in the metaverse environment;

determining whether the digital asset is compatible with the brandmark by determining whether the first set of control properties conflict with the second set of control properties;

generating a matching hash based on a set of combined control properties that include the first set of control properties, the second set of control properties, and at least one other set of control properties of at least one other digital asset, wherein the digital asset and the at least one other digital asset are associated with an avatar being rendered in the metaverse environment;

validating the avatar for rendering in the metaverse environment based on the matching hash; and rendering the digital asset with the brandmark in the metaverse environment based on determining that the digital asset is compatible with the brandmark.

19. The one or more non-transitory computer readable storage media of claim 18, wherein the instructions cause the processor to render the digital asset with the brandmark by:

generating a digital representation that includes the digital asset with the brandmark thereon based on the first set of control properties and the second set of control properties, which further define attributes of combining the digital asset with the brandmark for rendering; and configuring the metaverse environment to include the digital representation.

20. The one or more non-transitory computer readable storage media of claim 19, wherein the instructions cause the processor to determine whether the digital asset is compatible with the brandmark by:

transforming by hashing the first set of control properties and the second set of control properties into a third set of combined control properties identifying an integration of the digital asset with the brandmark.

21. The one or more non-transitory computer readable storage media of claim 20, wherein:

generating a matching hash comprises hashing the third set of combined control properties and the digital asset with the brandmark rendered in the metaverse environment; and validating comprises validating that the digital representation complies with the first set of control properties and the second set of control properties using the matching hash.

* * * * *